US011249600B2

(12) United States Patent
Agari et al.

(10) Patent No.: US 11,249,600 B2
(45) Date of Patent: Feb. 15, 2022

(54) DISPLAY DEVICE

(71) Applicant: Mitsubishi Electric Corporation, Chiyoda-ku (JP)

(72) Inventors: Masafumi Agari, Tokyo (JP); Tae Orita, Tokyo (JP); Takeshi Ono, Tokyo (JP); Toshiaki Fujino, Tokyo (JP); Kozo Ishida, Tokyo (JP); Seiichiro Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 91 days.

(21) Appl. No.: 16/334,068

(22) PCT Filed: Oct. 12, 2017

(86) PCT No.: PCT/JP2017/036933
§ 371 (c)(1),
(2) Date: Mar. 18, 2019

(87) PCT Pub. No.: WO2018/074309
PCT Pub. Date: Apr. 26, 2018

(65) Prior Publication Data
US 2019/0258340 A1 Aug. 22, 2019

(30) Foreign Application Priority Data

Oct. 19, 2016 (JP) .............................. JP2016-204963

(51) Int. Cl.
*G06F 3/044* (2006.01)
*G06F 3/041* (2006.01)
(52) U.S. Cl.
CPC .............. *G06F 3/044* (2013.01); *G06F 3/041* (2013.01); *G06F 3/0412* (2013.01);
(Continued)

(58) Field of Classification Search
None
See application file for complete search history.

(56) References Cited

U.S. PATENT DOCUMENTS

2010/0110033 A1  5/2010  Sakai
2011/0057904 A1* 3/2011  Yamano ................. H01G 5/16
                                              345/174
(Continued)

FOREIGN PATENT DOCUMENTS

CN     105183257 A    12/2015
JP     2010-113490 A   5/2010
(Continued)

OTHER PUBLICATIONS

International Search Report dated Nov. 28, 2017 in PCT/JP2017/036933 filed on Oct. 12, 2017.

*Primary Examiner* — Benjamin C Lee
*Assistant Examiner* — Emily J Frank
(74) *Attorney, Agent, or Firm* — Xsensus LLP

(57) ABSTRACT

A display device according to the present invention includes a touch panel, a dielectric sheet, a frame, and a display panel. The touch panel has a touch sensor portion in the middle and a first electrode in an inner peripheral portion. Further, the dielectric sheet is closely adhered the back surface of the touch panel in its front surface. The frame has an opening in the central portion thereof and a second electrode in a marginal portion that is closely adhered the back surface of the dielectric sheet. The display panel has a display surface to display a screen image and the display surface is closely adhered the back surface of the dielectric sheet in the opening of the frame. The first electrode and the second electrode constitute a pressure-sensitive sensor that has a function to detect a pressing force when an operation element touches the front surface of the touch panel. Thus, a highly reliable display device with a touch panel can be (Continued)

provided in which degradation in the visibility of the display panel can be avoided and the stress occurring in the pressure-sensitive sensor is reduced.

14 Claims, 23 Drawing Sheets

(52) U.S. Cl.
CPC .......... *G06F 3/0445* (2019.05); *G06F 3/0446* (2019.05); *G06F 3/04146* (2019.05); *G06F 2203/04105* (2013.01); *G06F 2203/04106* (2013.01)

(56) References Cited

U.S. PATENT DOCUMENTS

| | | | |
|---|---|---|---|
| 2011/0115738 A1* | 5/2011 | Suzuki | G06F 3/0447 345/173 |
| 2011/0157087 A1 | 6/2011 | Kanehira et al. | |
| 2011/0175845 A1 | 7/2011 | Honda et al. | |
| 2012/0068965 A1* | 3/2012 | Wada | G06F 3/044 345/174 |
| 2016/0062500 A1* | 3/2016 | Kessler | G06F 3/0447 345/174 |
| 2017/0262112 A1* | 9/2017 | Noguchi | G02F 1/134336 |
| 2017/0269756 A1* | 9/2017 | Wang | G06F 3/0414 |
| 2017/0277321 A1* | 9/2017 | Ding | G06F 3/04166 |
| 2017/0357345 A1* | 12/2017 | Ikeda | H01L 27/3246 |
| 2018/0046295 A1* | 2/2018 | Weng | G02F 1/133514 |
| 2018/0088700 A1* | 3/2018 | Cao | G02F 1/133602 |
| 2019/0067795 A1* | 2/2019 | Shin | H01Q 1/243 |
| 2019/0227661 A1* | 7/2019 | Kim | G06F 3/041 |
| 2019/0302924 A1* | 10/2019 | Kim | G02F 1/13338 |
| 2019/0311172 A1* | 10/2019 | Kang | G06K 9/0002 |
| 2021/0294443 A1* | 9/2021 | Kim | G06F 3/0412 |

FOREIGN PATENT DOCUMENTS

| | | |
|---|---|---|
| JP | 2010-244514 A | 10/2010 |
| JP | 2011-100364 A | 5/2011 |
| JP | 2011-221856 A | 11/2011 |
| JP | 2012-64108 A | 3/2012 |

* cited by examiner

DISPLAY DEVICE

TECHNICAL FIELD

The present invention relates to a display device provided with a touch panel.

BACKGROUND ART

A conventional display device includes a touch panel to detect the position on an operation input screen at which an operation element such as a touch pen or a human finger touches, a display panel disposed in the backside of the touch panel, a display cover to cover the top face of the touch panel, and a frame to house the touch panel and the display panel. In addition, a pressure-sensitive sensor is disposed between the display cover and the frame. When an operation element touches the operation input screen of the touch panel, the pressure-sensitive sensor detects the pressing force, and an input to the touch panel can be determined. With this determination, it is possible to reduce an erroneous input that is not an input determination and is caused alone by a contact of an operation element on the operation input screen of the touch panel (for example, Patent Document 1).

In addition, another conventional display device houses a liquid crystal panel in its housing and disposes a touch panel on the front side of the liquid crystal panel. Note that, the touch panel is supported by the marginal portion of the housing via a pressure-sensitive sensor. As with the case of the conventional display device shown in Patent Document 1, because a pressure-sensitive sensor detects the pressing force, this another conventional display device also can determine an input to the touch panel when an operation element touches the operation input screen of the touch panel. With this determination, an input error that is not an input determination and is caused alone by a contact of an operation element on the operation input screen of the touch panel can be reduced (for example, Patent Document 2).

PRIOR ART DOCUMENTS

Patent Document

Patent Document 1
Japanese Patent Laid-Open Publication No. 2011-100364
Patent Document 2
Japanese Patent Laid-Open Publication No. 2010-244514

SUMMARY OF THE INVENTION

Problems to be Solved by the Invention

In a conventional display device as shown in Patent Document 1, the display surface of the display panel is closely adhered the back surface of the touch panel, and the front surface of the touch panel is closely adhered the back surface of the display cover. In addition, the display cover is connected to the frame in the marginal portion of its back surface via a pressure-sensitive sensor. This means that the display panel, the touch panel, and the display cover are supported by the frame only through the pressure-sensitive sensor. Thus, when vibration or shock is applied to the display device, the stress depending on the weight of the display panel, the touch panel, and the display cover may be applied to the pressure-sensitive sensor. In such a case, an excessive stress may be applied to the pressure-sensitive sensor and a problem arises in that the stress is a cause of malfunction in the pressure-sensitive sensor. In particular, when such a conventional display device is used for a portable electronic device such as a tablet, the problem may become more serious because it may be frequently exposed to vibration and shock.

Further, in a conventional display device as shown in Patent Document 2, only the touch panel is supported by the housing (frame) via a pressure-sensitive sensor. That is to say, the weight to be supported by the pressure-sensitive sensor is less compared with the conventional display device as shown in Patent Document 1. Thus, when vibration or shock is applied to the pressure-sensitive sensor, the stress occurring therein is considered to be relatively small. However, a conventional display device as shown in Patent Document 2 has a air gap between the touch panel and the display panel. Thus, multiple reflection of visible light occurs between the back surface of the touch panel and the screen of the display panel that form boundaries of the air gap, so that a problem arises in that the visibility of the display panel is degraded.

The present invention is made to solve the above problems, and degradation in the visibility of the display panel can be avoided and the malfunction can be prevented by reducing the stress occurring in the pressure-sensitive sensor.

Means for Solving Problem

The display device according to the present invention includes a touch panel, a dielectric sheet, a frame, and a display panel. The touch panel has a touch sensor portion in the central portion thereof for detecting a position at which the operation element touches and a first electrode in an inner peripheral portion thereof. The dielectric sheet is closely adhered in its front surface with the back surface of the touch panel. The frame has an opening in the central portion thereof and a second electrode in a marginal portion that is closely adhered the back surface of the dielectric sheet. The display panel has a display surface to display a screen image, and the display surface is closely adhered the back surface of the dielectric sheet in the opening of the frame. Further, the first electrode and the second electrode constitute a pressure-sensitive sensor.

Effects of the Invention

According to the present invention, the touch panel is supported by the frame and the display panel via the dielectric sheet. Therefore, even when vibration or shock is applied to the display device, the stress occurring at the pressure-sensitive sensor can be reduced to prevent operational failure. In addition, the back surface of the touch panel is closely adhered the front surface of the dielectric sheet and the display surface of the display panel is closely adhered the back surface of the dielectric sheet, so that degradation due to the air gap in terms of the visibility of the screen image in the display panel does not take place. Thus, a display device with a touch panel, has high visibility of the screen image in the display panel, and is highly reliable can be obtained.

EMBODIMENTS FOR CARRYING OUT THE INVENTION

First Embodiment

Figure 1:
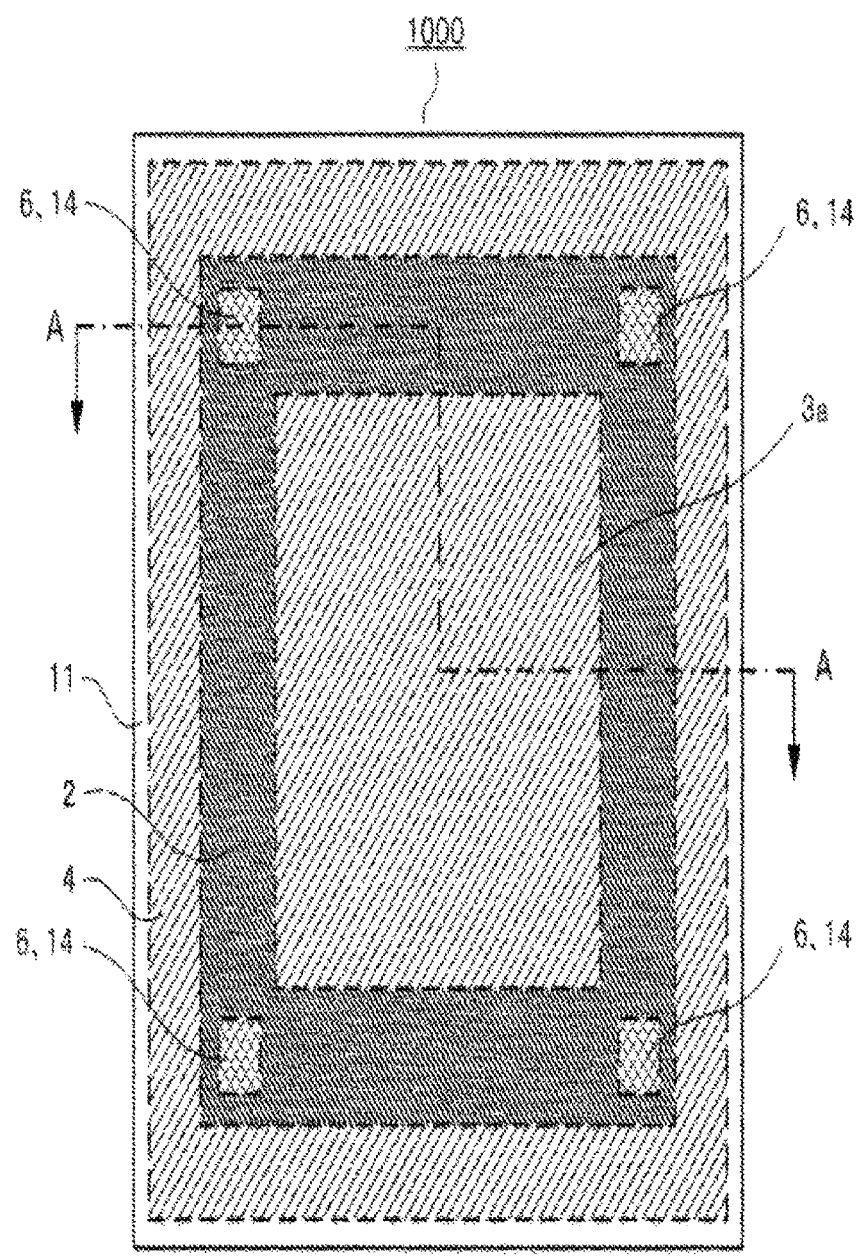
FIG. 1 is a plan view of a display device 1000 according to a First embodiment of the present invention.
Figure 2:
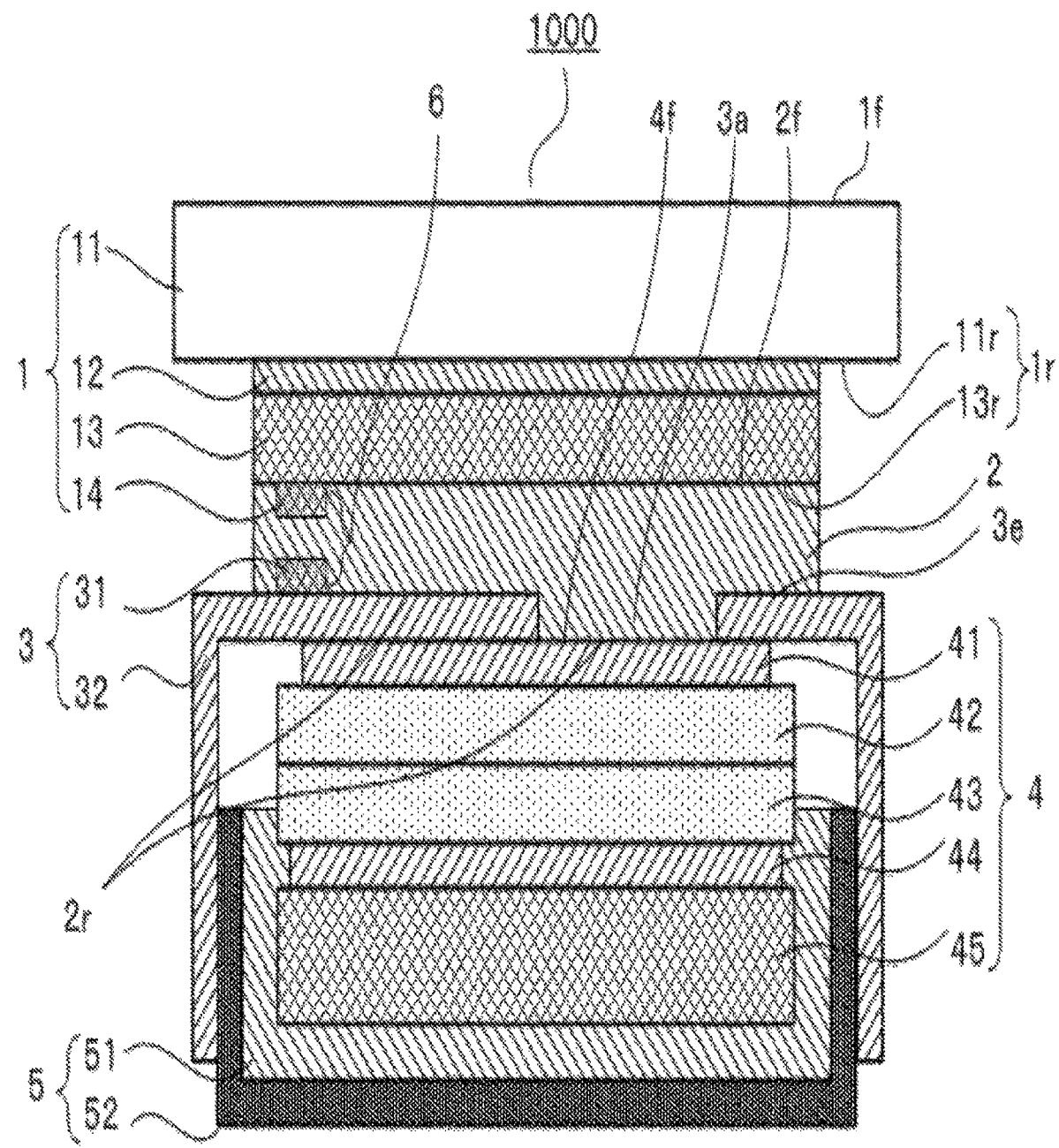
FIG. 2 is a cross-sectional view of the display device 1000.
Figure 3:
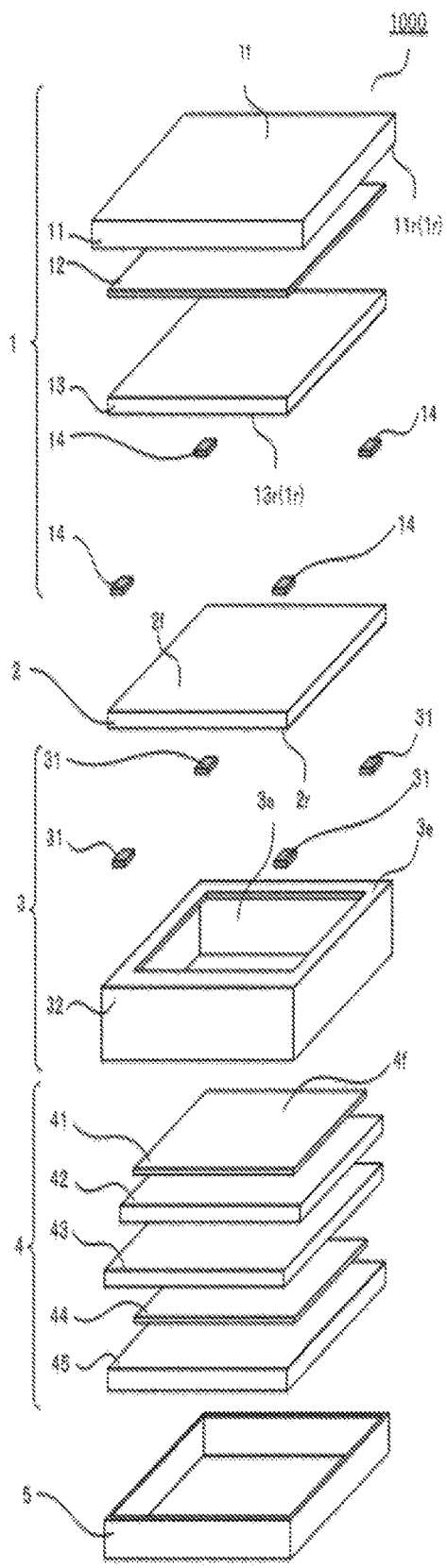
FIG. 3 is an exploded perspective view of a structure of the display device 1000.

FIGS. 1 to 9 show a first embodiment for carrying out the present invention. First, referring to FIGS. 1 to 3, a structure of a display device 1000 according to the first embodiment will be described. FIG. 1 is a plan view of the display device 1000 according to the first embodiment for carrying out the present invention, and FIG. 2 is a cross-sectional view thereof taken along the chain line A-A shown in FIG. 1. Further, FIG. 3 is an exploded perspective view of the display device 1000.

The display device 1000 according to the present invention includes a touch panel 1, a dielectric sheet 2, a frame 3, and a liquid crystal panel 4. Note that the dielectric sheet 2 is an example of the dielectric described in the claims and the liquid crystal panel 4 is an example of the display panel described in the claims. The back surface 1r of the touch panel 1 is adhered to the front surface 2f of the dielectric sheet 2. Note that the back surface 1r of the touch panel 1 corresponds to the back surface 13r of a touch sensor substrate 13 and to the back surface marginal portion 11r of a protective plate 11. In the present first embodiment, the back surface 1r of the touch panel 1 that is closely adhered the front surface 2f of the dielectric sheet 2 corresponds to the back surface 13r of the touch sensor substrate 13. In addition, the back surface 2r of the dielectric sheet 2 is closely adhered a marginal portion 3e of the frame 3. Further, the back surface 2r of the dielectric sheet 2 is closely adhered the display surface 4f of the liquid crystal panel 4 in an opening 3a of the frame 3.

In addition, the frame 3 and a rear cover 5 are fitted and fixed together, and the liquid crystal panel 4 is housed inside the space surrounded by the frame 3 and the rear cover 5.

Further, a pressure-sensitive sensor 6 is constituted with a first electrode 14 formed in an inner peripheral portion of the back surface 1r of the touch panel 1 (the back surface 13r of the touch sensor substrate 13), a second electrode 31 formed on the marginal portion 3e of the frame 3, and the dielectric sheet 2 between the first electrode 14 and the second electrode 31. In other words, in the present first embodiment, the first electrode 14 and the second electrode 31 are disposed to face each other with the dielectric sheet 2 sandwiched between them. In addition, in the present first embodiment, the inner peripheral portion of the touch panel 1 is a portion in the back surface 13r of the touch sensor substrate 13 and the portion facing the marginal portion 3e of the frame 3 via the dielectric sheet 2.

As the dielectric sheet 2, an optical clear adhesive (OCA) being an adhesive film, an optical clear resin (OCR) being a liquid adhesive, or the like are used. Note that, regarding the types of an OCA and an OCR, an ultraviolet ray curable type, a heat curing type, and the like are available.

Next, an example of a manufacturing method in which a sheet-type OCA is used for the dielectric sheet 2 will be described. First, the front surface of the OCA and the back surface 1r of the touch panel 1 are adhered together. Then, the back surface of the OCA and the marginal portion 3e of the frame 3 are adhered together and the back surface of the OCA and the display surface 4f of the liquid crystal panel 4 are adhered together. Then, when the OCA is an ultraviolet ray curable type, the OCA is cured by radiating ultraviolet rays, and when the OCA is a heat curing type, the OCA is cured by heating. As a result, the touch panel 1 and the liquid crystal panel 4 are adhered without a air gap between them and the touch panel 1 and the frame 3 are adhered to each other.

Further, an example of a manufacturing method in which a liquid type OCR is used for the dielectric sheet 2 will be described. First, the OCR is applied to the back surface 1r of the touch panel 1. The back surface 2r of the dielectric sheet 2 and the marginal portion 3e of the frame 3 are adhered together, and the back surface 1r of the touch panel 1 and the display surface 4f of the liquid crystal panel 4 are adhered together. Then, when the OCR is an ultraviolet ray curable type, the OCR is cured by radiating ultraviolet rays, and when the OCR is a heat curing type, the OCR is cured by heating. Thus, the touch panel 1 and the liquid crystal panel 4 are adhered without a air gap between them and the touch panel 1 and the frame 3 are adhered to each other.

Since the OCA and the OCR are cured to such an extent that a certain level of elasticity remains, the dielectric sheet 2 can be elastic in accordance with the pressing force and can hold the touch panel 1. Since the dielectric sheet 2 is used as a dielectric for the pressure-sensitive sensor 6, there is no need to insert a dielectric separately to form the pressure-sensitive sensor 6. In addition, the elastic modulus of the dielectric sheet 2 is generally about between $10^3$ and $10^6$ Pa. When the amount of deformation caused by the pressing force is larger, the change in the capacitance of the pressure-sensitive sensor 6 depending on the pressing force is larger. Thus, the detection sensitivity can be increased. In contrast, when the amount of deformation caused by the pressing force is larger, the response time of the pressure-sensitive sensor 6 becomes longer. Therefore, considering elastic and plastic behavior of the dielectric sheet 2 in accordance with the pressing force, cure extent can be appropriately controlled in the curing process of the dielectric sheet 2 using ultraviolet rays or heat. The thickness of the dielectric sheet 2 is set to such an extent that the level difference at the opening 3a of the frame 3 can be filled with the sheet (for example, up to about 1 mm).

Further, the refractive index of the OCA and the OCR after the cure (namely, the refractive index of the dielectric sheet 2) are set to be substantially equal to those of the materials for the back surface 13r of the touch sensor substrate 13 and the display surface 4f of the liquid crystal panel 4. Thus, degradation in the visibility of the display screen in the liquid crystal panel 4 due to multiple reflection of visible light between the back surface 1r of the touch panel 1 and the display surface 4f of the liquid crystal panel 4 does not take place. For example, the refractive index of the dielectric sheet 2 is set to 1.4 to 1.6. When a glass (to be described later) is used for the touch sensor substrate 13, the refractive index of the glass is about 1.5, and the refractive index of a polarizing plate 41 on the front surface of a color filter substrate 42 (to be described later) is substantially the same as that of the glass. That is, as described above, the touch sensor substrate 13 and the polarizing plate 41 are adhered without the air gap between them, and thus the refractive indexes of the touch sensor substrate 13, the dielectric sheet 2, and the polarizing plate 41 can be set to substantially the same to each other.

Next, the touch panel 1, the frame 3, and the liquid crystal panel 4 will be described in detail. When an operation element such as a touch pen or a human finger touches the front surface 1f of the touch panel 1, the touch panel 1, as the functions thereof, detects the position on the front surface 1f of the touch panel 1 and outputs the detection information to the outside. The touch panel 1 includes a protective plate 11 made of a transparent plate such as a glass or an acrylic resin, a touch sensor substrate 13 also made of a transparent plate such as a glass or an acrylic resin, and a first electrode 14 formed on the back surface 13r of the touch sensor substrate 13. Note that the protective plate 11 and the touch sensor substrate 13 are stuck together with an adhesive 12. The first electrode 14 is connected to a pressure-sensitive sensor detection circuit 85 (to be described later) via wiring (not illustrated).

The frame 3 includes a main frame 32 and a second electrode 31. An opening (the opening 3a of the frame 3) is provided in the central portion of the main frame 32 and the second electrode 31 is provided in the marginal portion (the marginal portion 3e of the frame 3) of the main frame 32. The second electrode 31 is grounded via wiring (not illustrated).

Note that, the first electrode 14 and the second electrode 31 are formed by using a method such as adhering of a thin conductive plate of metal, etc. or forming of a thin plate by vaporizing a metal material using a deposition technique or the like.

The liquid crystal panel 4, provided with a screen on its display surface 4f, has a function to display a movie and a still image on the screen when it receives image signals from the outside. Note that the screen is disposed to fit in the opening 3a of the frame 3, so that the screen image can be seen from the direction of the front surface 1f of the touch panel 1. The liquid crystal panel 4 includes a color filter substrate 42 with a color filter, a thin film transistor (TFT) array substrate 43 with TFT, the polarizing plate 41 on the front surface of the color filter substrate 42, a polarizer 44 on the back surface of the TFT array substrate 43, and a backlight module 45. The color filter substrate 42 and the TFT array substrate 43 are stuck together having a liquid crystal (not illustrated) sandwiched between them. The backlight module 45 is disposed on the back surface of the TFT array substrate 43.

The rear cover 5 includes a soft cover 51 and a hard cover 52. The soft cover 51 made of an elastic material such as resin is in contact with the side surfaces and the back surface of the liquid crystal panel 4 and absorbs shocks being externally transmitted to the liquid crystal panel 4. The hard cover 52 made of a hard material such as a metal contains the soft cover 51 and protects the liquid crystal panel 4 from shocks and against water leakage.

Figure 4:
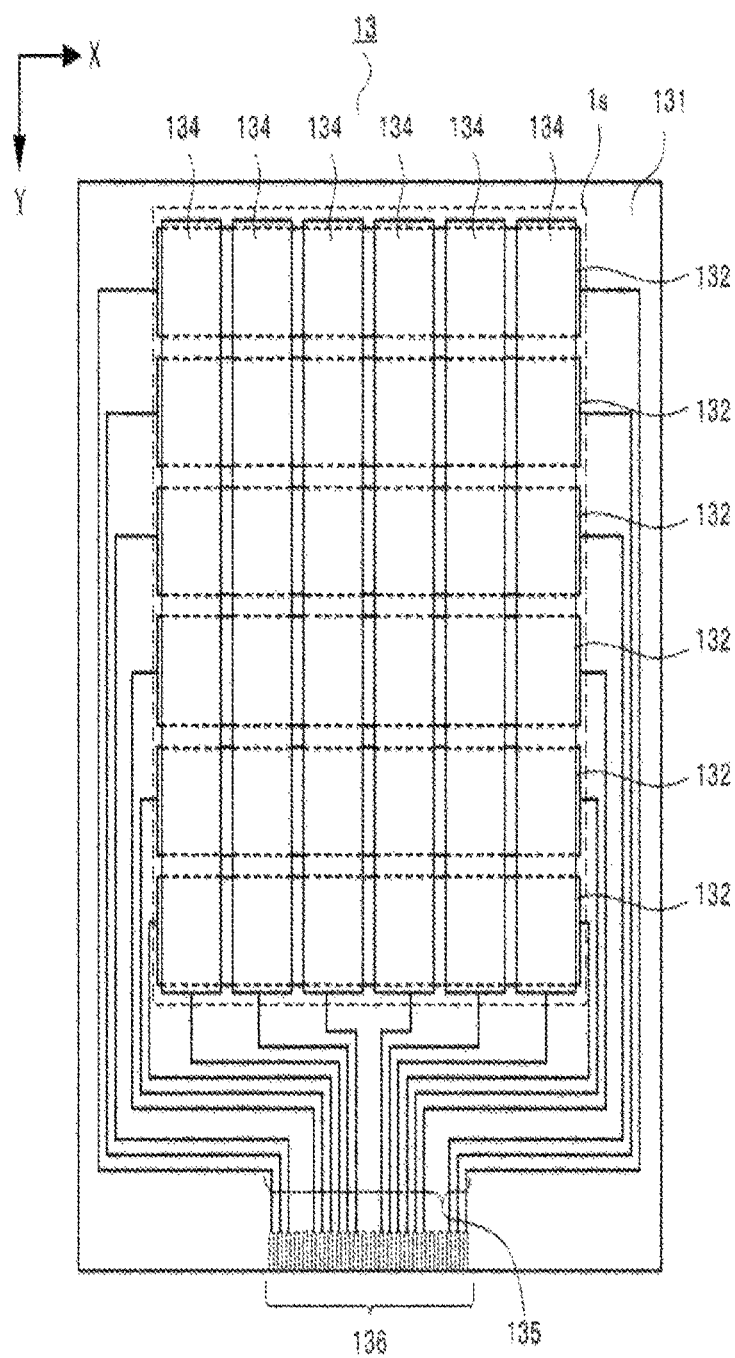
FIG. 4 is a plan view of a touch sensor substrate 13.
Figure 5:
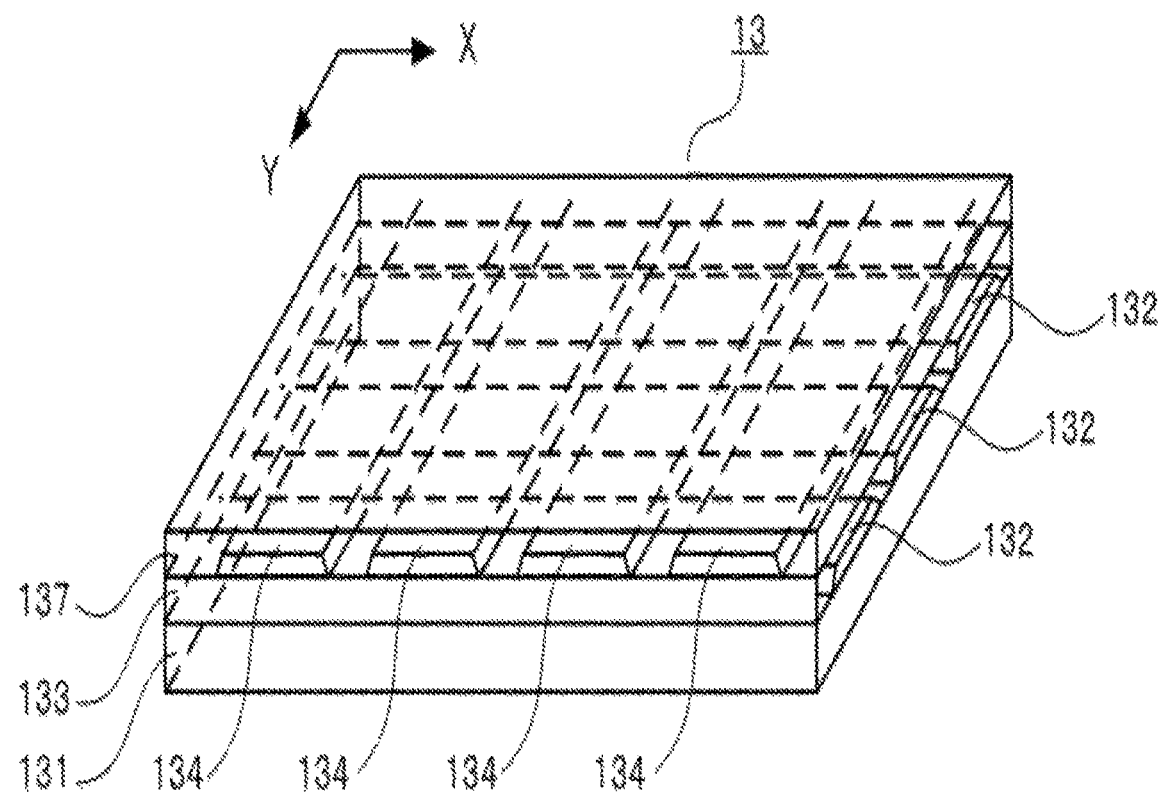
FIG. 5 is a perspective view of a part of the touch sensor substrate 13.

Next, referring to FIGS. 4 to 9, a structure of the touch sensor substrate 13 and a structure as well as an operation of the pressure-sensitive sensor 6 will be described. First, referring to FIG. 4 and FIG. 5, a structure of the touch sensor substrate 13 will be described. FIG. 4 is a plan view of the front side of the touch sensor substrate 13 that is a component of the display device 1000. FIG. 5 is a perspective view of a part of the touch sensor substrate 13.

The touch sensor substrate 13 includes, on a transparent substrate 131 made of a glass or an acrylic resin, multiple row sensor electrodes 132 arranged in the Y-direction shown in the figure, an interlayer insulating film 133 formed so as to cover the row sensor electrodes 132, multiple column sensor electrodes 134 arranged in the X-direction shown in the figure on the interlayer insulating film 133, and a protective film 137 formed so as to cover the column sensor electrodes 134. Further, each of the row sensor electrodes 132 and the column sensor electrodes 134 are connected to a first end of each of lead wirings 135. In addition, a second end of each of the lead wirings 135 is connected to each of connecting terminals 136. The touch sensor portion 1s is a portion in which the row sensor electrodes 132 and the column sensor electrodes 134 are formed and the position at which an operation element touches on the front surface 1f of the touch panel 1 is to be detected. The detail will be described later.

The row sensor electrodes 132 and the column sensor electrodes 134 are formed of a transparent conductive film such as indium tin oxide (ITO), a fine metal mesh wiring or the like. The interlayer insulating film 133 and the protective film 137 each are made of a transparent insulating film such as a silicon oxide film, a tetraethyl orthosilicate (TEOS) film, and a silicon nitride film. Generally, the connecting terminals 136 are electrically connected to the outside by connecting them to a flexible printed circuit (FPC), etc.

Note that, as a formation method for the row sensor electrodes 132 and the column sensor electrodes 134, for example, there is a method in which photolithography and etching is used to form the row and column electrodes after the transparent conductive film, the fine metal mesh wirings, etc. are deposited on the transparent substrate 131.

Figure 6:
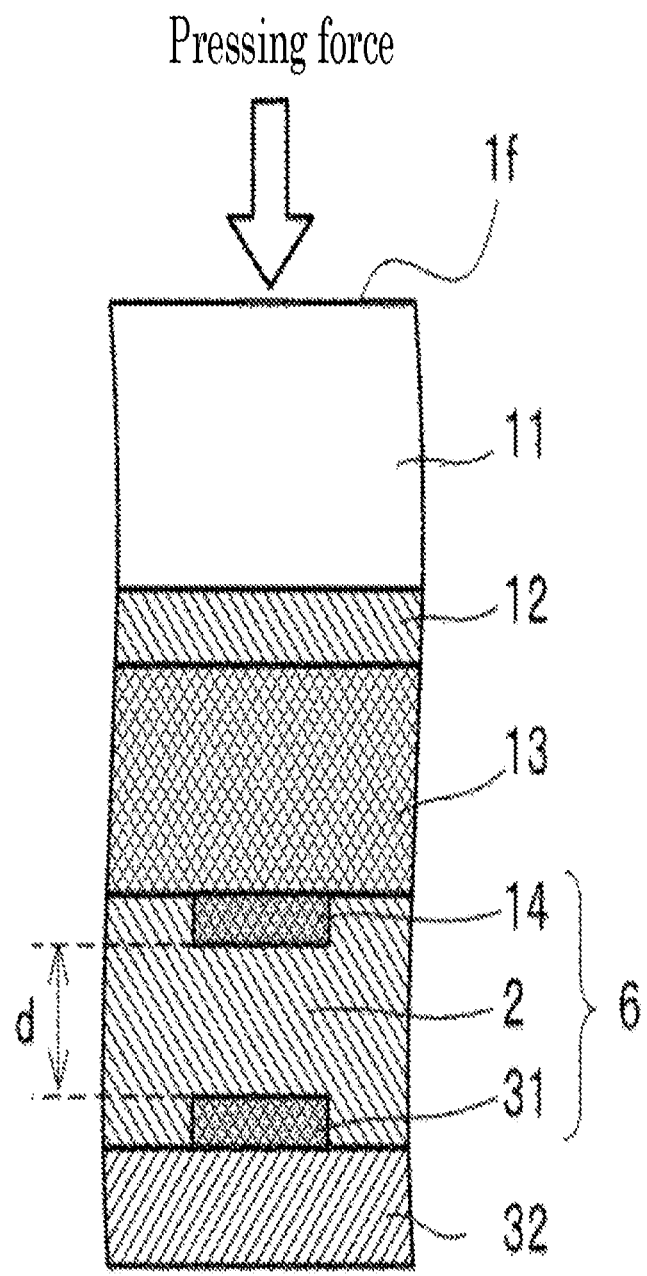
FIG. 6 is a cross-sectional view of a pressure-sensitive sensor 6.
Figure 7:
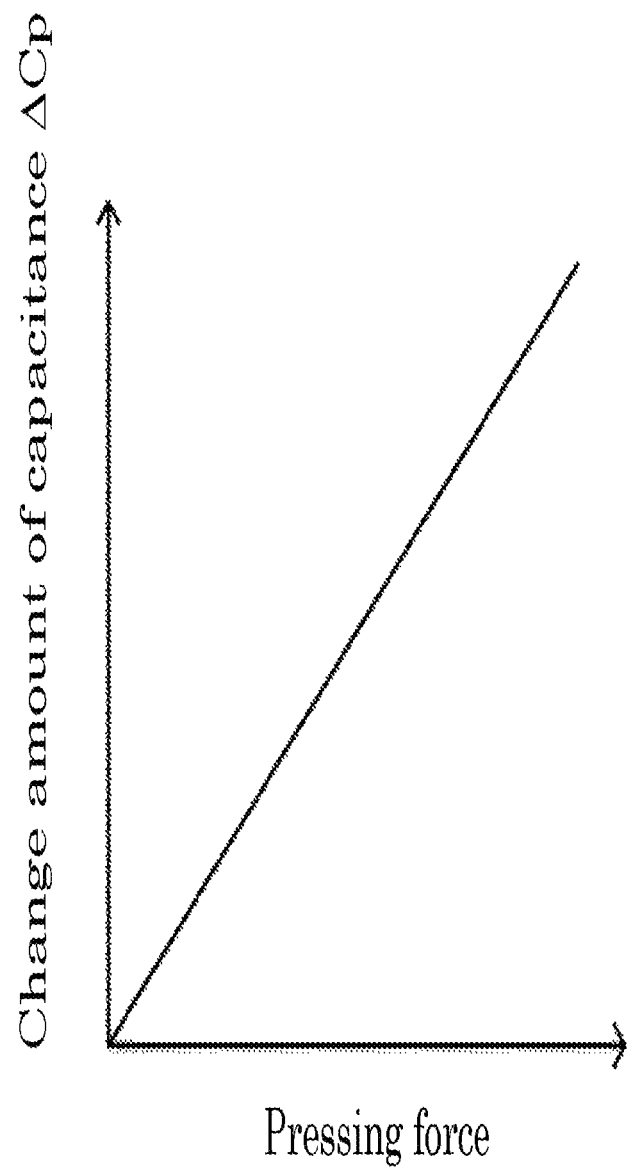
FIG. 7 is a graph showing a relationship between the amount of change in the capacitance Cp of the pressure-sensitive sensor 6 and pressing force.
Figure 8:
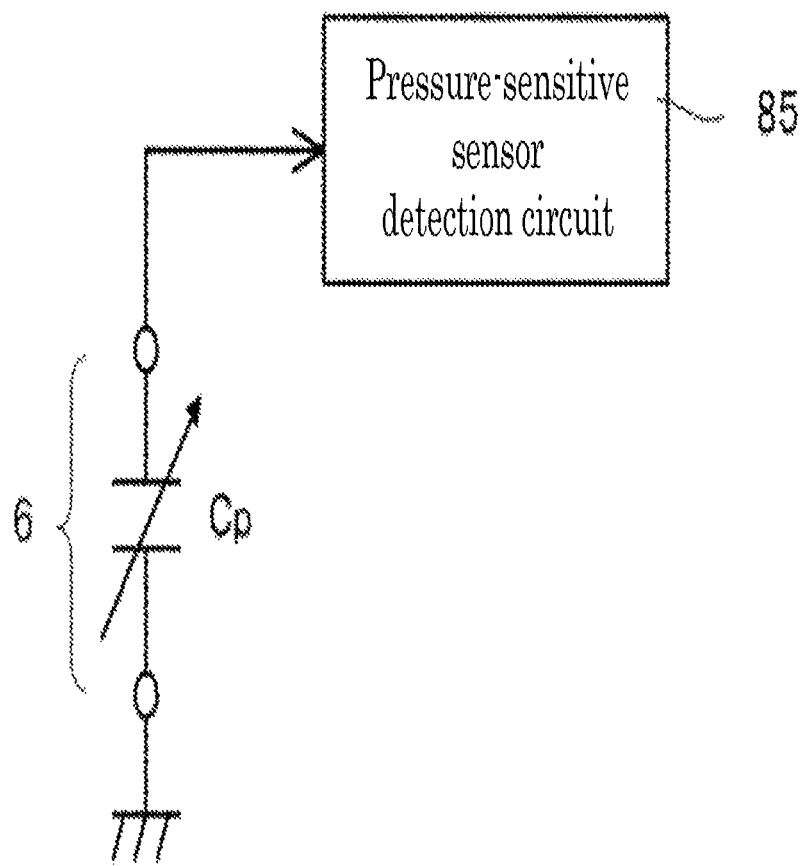
FIG. 8 is an electrical connection diagram of the pressure-sensitive sensor 6.

Next, referring to FIGS. 6 to 8, a structure and an operation of the pressure-sensitive sensor 6 will be described. FIG. 6 is a cross-sectional view around the pressure-sensitive sensor 6, and FIG. 7 is a graph showing a relationship between the change amount in the capacitance of the pressure-sensitive sensor 6 and the pressing force. FIG. 8 is an electrical connection diagram of the pressure-sensitive sensor 6.

Referring to FIG. 6, a cross-sectional structure around the pressure-sensitive sensor 6 will be described. The first electrode 14, the second electrode 31, and the dielectric sheet 2 between them constitute the pressure-sensitive sensor 6 that is a capacitive type. In the present first embodiment, the distance d indicates the distance between the first electrode 14 and the second electrode 31. In addition, as described before, when a pressing force is applied by an operation element to the front surface 1$f$ of the touch panel 1, the dielectric sheet 2 is elastic, so that the distance d changes within a certain range in accordance with the pressing force. Further, the capacitance Cp of the pressure-sensitive sensor 6 depends on the thickness (the distance d) and the dielectric constant of the dielectric sheet 2.

Referring to FIG. 7, the characteristics of the pressure-sensitive sensor 6 will be described. The vertical axis represents the change amount ΔCp of the capacitance Cp of the pressure-sensitive sensor 6 and the horizontal axis represents the pressing force. The larger the pressing force is, the more the distance d decreases by contraction. Further, the change amount ΔCp changes in accordance with the change amount of the distance d. That is, the sensor has a characteristic such that the change amount ΔCp increases monotonically in accordance with the pressing force. Referring to FIG. 8, an equivalent circuit and electrical connection of the pressure-sensitive sensor 6 will be described. One of the terminals of the capacitance Cp of the pressure-sensitive sensor 6 is grounded via wiring, and the other is connected to the pressure-sensitive sensor detection circuit 85 via wiring. Note that, the pressure-sensitive sensor detection circuit 85 will be described later.

Next, the operation of the pressure-sensitive sensor 6 will be described. As described above, since the change amount ΔCp of the capacitance Cp changes in accordance with the pressing force, when an operation element applies the pressing force to the front surface 1$f$ of the touch panel 1, the pressure-sensitive sensor detection circuit 85 can detect the pressing force applied by the operation element to the front surface 1$f$ of the touch panel 1 by detecting the change amount ΔCp.

Figure 9:
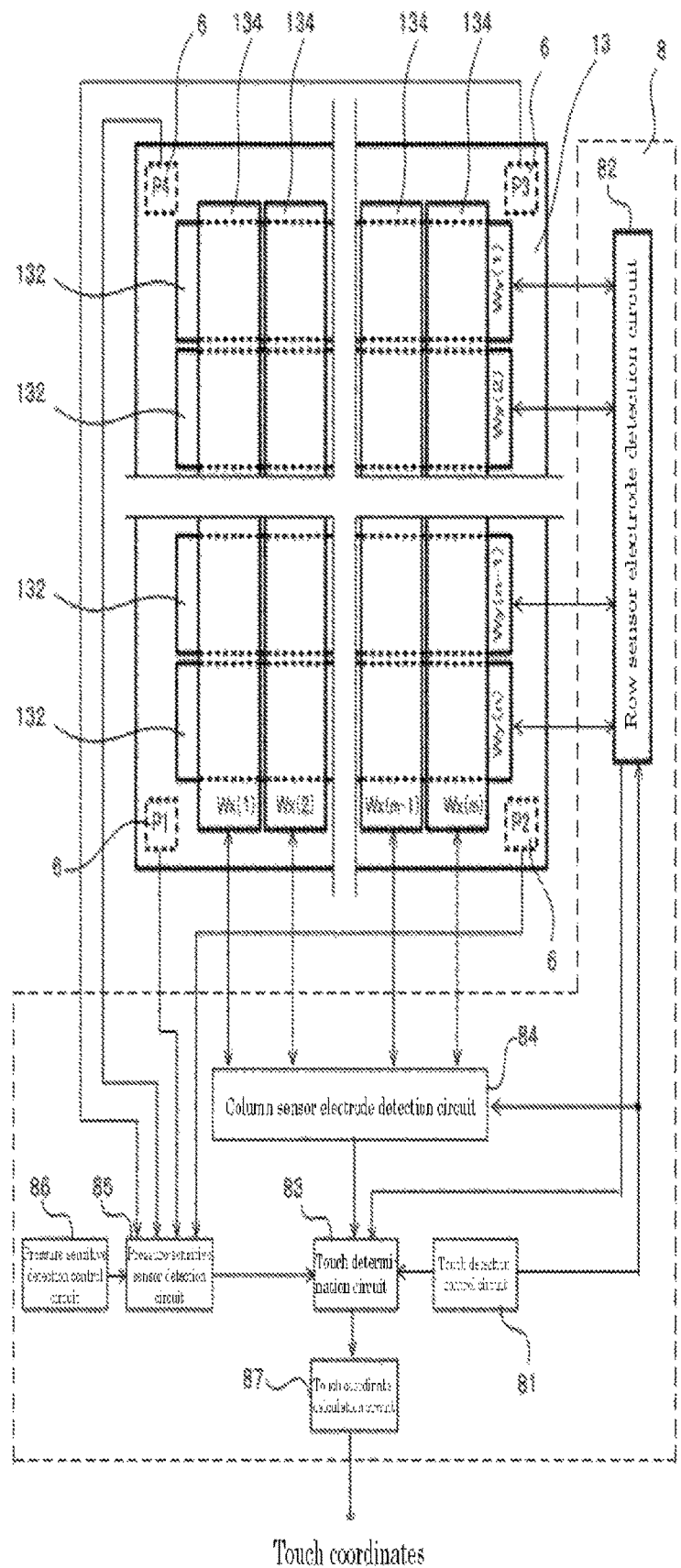
FIG. 9 shows a block diagram of a coordinate detection circuit 8 and a diagram showing the electrical connection between the coordinate detection circuit 8 and the touch sensor substrate 13.

Next, the operation in which the pressing force applied by the operation element is detected and the position on the front surface 1$f$ of the touch panel 1 at which the operation element touches the surface is outputted will be described in detail. FIG. 9 shows a block diagram of the coordinate detection circuit 8 that detects a position on the front surface 1$f$ of the touch panel 1 at which the operation element touches the surface, parts on the touch sensor substrate 13, and the electrical connection between the circuit and the parts.

First, a method to detect the position at which the operation element touches the front surface 1$f$ of the touch panel 1 will be described. Note that, the method for the touch panel 1 to be described in the present first embodiment is called mutual capacitance method, which is one of capacitance methods. As described later, the mutual capacitance method is a method in which voltage is applied sequentially to each of the row sensor electrodes 132, the electric charge amount in each of the column sensor electrodes 134 is read out, and the position touched by the operation element is detected.

Referring to FIG. 9, the coordinate detection circuit 8 includes a touch detection control circuit 81, a row sensor electrode detection circuit 82, a touch determination circuit 83, a column sensor electrode detection circuit 84, a pressure-sensitive sensor detection circuit 85, a pressure-sensitive detection control circuit 86, and a touch coordinate calculation circuit 87.

The row sensor electrode detection circuit 82 is connected individually with each of the multiple row sensor electrodes 132. Here, for the description of the operation, it is assumed that the number of the row sensor electrodes 132 from the top to the bottom in the drawing is n (n is a natural number), the top of the row sensor electrodes 132 in the drawing is assigned with Wy(1), and the electrodes from the top to the bottom in the drawing are assigned with Wy(1), Wy(2), . . . , Wy(n-1), and Wy(n) in order.

Similarly, the column sensor electrode detection circuit 84 is connected individually with each of the multiple column sensor electrodes 134. Note that, for the description of the operation, it is assumed that the number of the column sensor electrodes 134 from the left to the right in the drawing is m (m is a natural number), the left-most of the column sensor electrodes 132 in the drawing is assigned with Wx(1), and the electrodes from the left to the right in the drawing are assigned with Wx(1), Wx(2), . . . , Wx(m-1), and Wx(m) in order.

Upon instruction from the touch detection control circuit 81, the row sensor electrode detection circuit 82 applies excitation pulses with a predetermined peak voltage value to the row sensor electrodes: Wy(1), Wy(2), . . . , Wy(n-1), and Wy(n), in order at a predetermined time interval T1. Further, upon instruction from the touch detection control circuit 81, the column sensor electrode detection circuit 84 detects the electric charge amounts at intersections between the row sensor electrodes 132 and the column sensor electrodes 134 within the time interval T1 via the column sensor electrodes 134: Wx(1), Wx(2), . . . , Wx(m-1), and Wx(m), performs A/D conversion on the analog signals corresponding to the electric charge amounts, and then outputs the digital signals to the touch determination circuit 83. In addition, the touch detection control circuit 81 outputs a signal synchronized with the time interval T1 to the touch determination circuit 83. Through these operations, the touch determination circuit 83 inputs the position information (referred to as coordinates of intersection) of all the intersections between the row sensor electrodes 132 and the column sensor electrodes 134 as well as the information on the electric charge amounts corresponding to the coordinates of the intersections.

Further, the signals corresponding to all of the coordinates of the intersections and the electric charge amounts are outputted from the touch determination circuit 83 to the touch coordinate calculation circuit 87 to be stored therein.

When an operation element touches the front surface 1$f$ of the touch panel 1, the capacitance at the intersection between the row sensor electrode 132 and the column sensor electrode 134 corresponding to the touched position changes, and accordingly, the electric charge amount at the intersection changes. Therefore, it can be seen that the coordinates on the operation screen (referred to as touch coordinates) at which the operation element touches the front surface 1$f$ of the touch panel 1 is in the vicinity of the coordinates of intersections in which the electric charge amounts locally differ among the electric charge amounts in the coordinates of all the intersections.

Next, an operation of pressure-sensitive sensors 6 will be described. The pressure-sensitive sensors 6, the positions of which are indicated by P1 to P4, each are connected to the pressure-sensitive sensor detection circuit 85. Upon instruction of the pressure-sensitive detection control circuit 86, the pressure-sensitive sensor detection circuit 85, at a predetermined timing, detects the capacitance Cp of each of the pressure-sensitive sensors 6 located at the positions P1 to P4, performs A/D conversion on the analog signal corresponding to the capacitance Cp of each of the pressure-sensitive sensors 6 at the positions P1 to P4, and outputs the resultant signals to the touch determination circuit 83.

Further, an operation in which whether the operation element touches the front surface 1f of the touch panel 1 is determined and the touch coordinates are outputted will be described. When the sum of the change amounts ΔCp of the capacitances Cp of the pressure-sensitive sensors 6 located at the positions P1 to P4 equals to or exceeds a predetermined value, the touch determination circuit 83 determines that the touch panel is pressed. Then, the touch determination circuit 83 instructs the touch coordinate calculation circuit 87 to output the touch coordinates to the outside. Upon instruction from the touch determination circuit 83 to output the touch coordinates to the outside, the touch coordinate calculation circuit 87 calculates the touch coordinates from all of the coordinates of the intersections and the electric charge amounts that are stored and outputs the signals corresponding to the touch coordinates. Note that, the period (hereinafter, referred to as touch detection frame) in which the mutual capacitance values at all the intersections between the column sensor electrodes 134 and the row sensor electrodes 132 are obtained by sequentially scanning all the row sensor electrodes 132: Wy (1), Wy (2), . . . , Wy (n-1), and Wy (n), in the touch panel and the period (hereinafter, referred to as pressure-sensitive detection frame) in which the capacitance values of all the pressure-sensitive sensors are obtained are synchronized. One touch detection frame may correspond to one pressure-sensitive detection frame. Instead, one touch detection frame may correspond to multiple pressure-sensitive detection frames, so that the pressure detection accuracy can be improved by the averaging.

Further, one touch detection frame and one pressure-sensitive detection frame may be separated in terms of time. In addition, one touch detection frame may include a part of or the whole of one pressure-sensitive detection frame.

In this way, from the detection result on the pressing force caused by the operation element based on the capacitance changes of the pressure-sensitive sensors 6, the input can be determined. With this determination, an input error that is not an input determination and caused alone by a contact of an operation element on the operation screen of the touch panel can be reduced, and thereby the operability can be improved.

For example, even when the capacitance at an intersection between a row sensor electrode 132 and a column sensor electrode 134 is changed by a water droplet or the like sticking to the front surface 1f of the touch panel 1 or by the disturbance noise entering from the outside of the device via its power supply or the like, erroneous detection of the touch coordinates can be prevented by determining the input on the basis of the pressing force detected by the pressure-sensitive sensors 6.

In addition, when liquid such as a water droplet sticks, an incorrect detection caused by capacitive coupling due to the liquid between a row sensor electrode 132 and the frame 3 or a column sensor electrode 134 and the frame 3 is difficult to be distinguished from the detection of a contact of an operation element. Even in such a case, erroneous detection of the touch coordinates can be prevented by determining the input on the basis of the pressing force detected by the pressure-sensitive sensors 6.

In this way, according to the present first embodiment, the display device 1000 can prevent erroneous detection of the touch coordinates. Further, the display device 1000 is provided with a structure in which the touch panel 1 is closely adhered and is held by the frame 3 and the liquid crystal panel 4 via the dielectric sheet 2. In other words, the back surface 13r of the touch sensor substrate 13 and the display surface 4f of the liquid crystal panel 4 are adhered to each other via the dielectric sheet 2 without the air gap between them. Further, the refractive index of the dielectric sheet 2 is set to be substantially the same as those of the materials forming the back surface 13r of the touch sensor substrate 13 and the display surface 4f of the liquid crystal panel 4. Thus, degradation in the visibility of the display screen in the liquid crystal panel 4 due to multiple reflection of visible light between the back surface 1r of the touch panel 1 and the display surface 4f of the liquid crystal panel 4 does not take place.

The back surface 13r of the touch sensor substrate 13 is adhered not only to the display surface 4f of the liquid crystal panel 4, but also to the marginal portion 3e of the frame 3, via the dielectric sheet 2. Being capable of holding the touch panel 1, the dielectric sheet 2 can prevent excessive stress on the pressure-sensitive sensors even when vibration or shock is applied to the display device. Therefore, the present invention can provide a display device with a touch panel and has high visibility of the screen image as well as high reliability.

Second Embodiment

In the first embodiment, a configuration is described in which the pressure-sensitive sensor 6 is composed of the first electrode 14, the second electrode 31, and the dielectric sheet 2 sandwiched between these electrodes. In the present second embodiment, a configuration will be described in which using the main frame 32 in the first embodiment formed of a conductive member, the conductive main frame 32b plays a role also as the second electrode 31. Since the conductive main frame 32b plays the role also as the second electrode 31, a process to form the second electrode 31 on the main frame 32 can be omitted. Thus, the manufacturing process of a display device 1001 is shorten, so that a cost reduction can be achieved.

Figure 10:
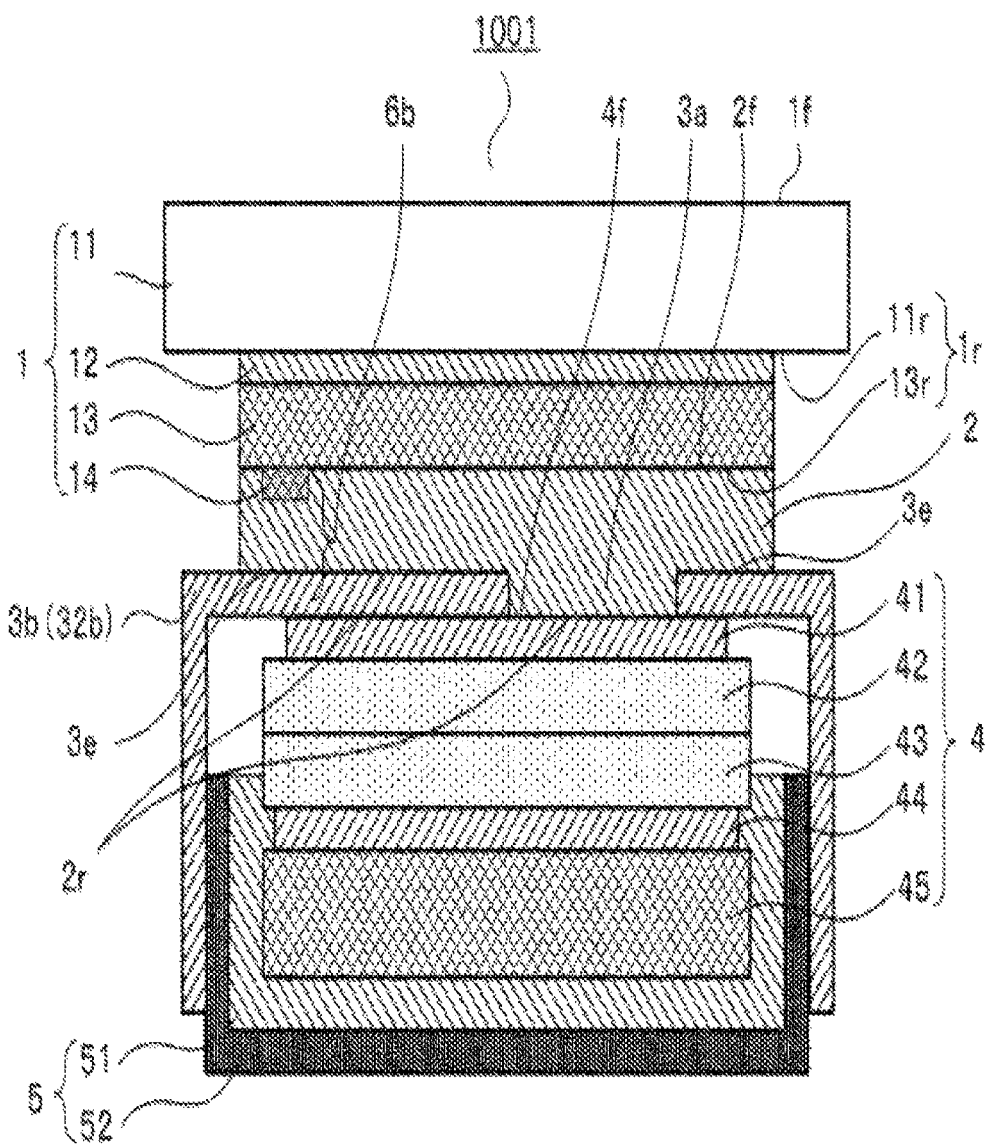
FIG. 10 is a cross-sectional view of a display device 1001 according to a second embodiment of the present invention.
Figure 11:
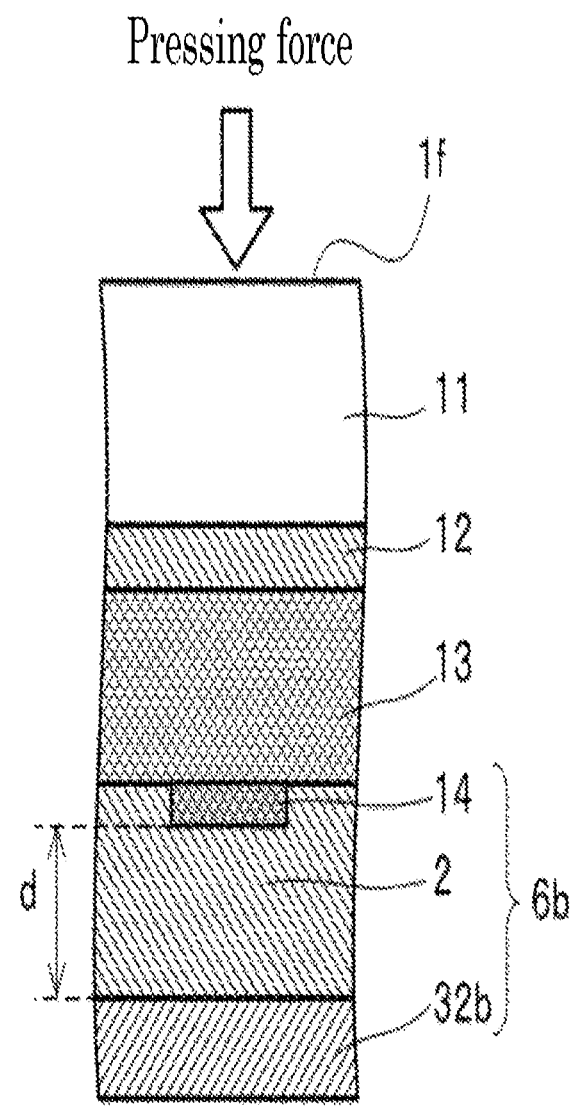
FIG. 11 is a cross-sectional view of a structure around a pressure-sensitive sensor 6b.

Referring to FIG. 10 and FIG. 11, a structure of the display device 1001 according to the present second embodiment will be described. FIG. 10 is a cross-sectional view of the structure of the display device 1001 according to the present second embodiment. Note that the plan view of the display device 1001 is substantially the same as the plan view shown in FIG. 1 of the first embodiment, and a pressure-sensitive sensor 6b is provided in place of the pressure-sensitive sensor 6 shown in FIG. 1. In addition, FIG. 10 is a cross-section at the same position along the chain line A-A in FIG. 1. Note that, in FIG. 10 and FIG. 11, the components given the same numerals or the same signs as used in FIGS. 1 to 9 each are the same or equivalent component shown in the first embodiment, and thus, the detailed description will be omitted.

Referring to FIG. 10, a structure of the display device 1001 according to the second embodiment will be described. The main frame 32b is formed of a conductive member made of a metal or a conductive resin, etc. and is grounded via wiring (not illustrated) in the same manner as the second electrode 31 in the first embodiment.

Next, referring to FIG. 11, the first electrode 14, the main frame 32b, and the dielectric sheet 2 sandwiched between them constitute the pressure-sensitive sensor 6b. In the present second embodiment, the distance d indicates the distance between the first electrode 14 and the main frame 32b. As is the case with the first embodiment, the capacitance Cp is formed between the first electrode 14 and the main frame 32b. The capacitance Cp has a characteristic that it changes in accordance with the distance d. This means that, as is the case with the first embodiment, the pressing force applied by an operation element to the front surface 1f of the touch panel 1 can be detected, and erroneous detection of the touch coordinates can be prevented. Note that, the operation to determine whether the operation element touches the front surface 1f of the touch panel 1 and to output the touch coordinates is the same as in the first embodiment.

In this way, according to the present second embodiment, as is the case with the first embodiment, the display device 1001 that prevents erroneous detection of the touch coordinates can be obtained. Further, the display device 1001 is provided with a structure in which the touch panel 1 is closely adhered and is held by the frame 3b and the liquid crystal panel 4 via the dielectric sheet 2. In other words, the back surface 13r of the touch sensor substrate 13 and the display surface 4f of the liquid crystal panel 4 are adhered via the dielectric sheet 2 without a air gap between them. Further, the refractive index of the dielectric sheet 2 is set to be substantially the same as those of the materials forming the back surface 13r of the touch sensor substrate 13 and the display surface 4f of the liquid crystal panel 4. Thus, degradation in the visibility of the display screen in the liquid crystal panel 4 due to multiple reflection of visible light between the back surface 1r of the touch panel 1 and the display surface 4f of the liquid crystal panel 4 does not take place.

The back surface 13r of the touch sensor substrate 13 is adhered not only to the display surface 4f of the liquid crystal panel 4, but also to the marginal portion 3e of the frame 3b, via the dielectric sheet 2. Being capable of holding the touch panel 1, the dielectric sheet 2 can prevent excessive stress on the pressure-sensitive sensor even when vibration or shock is applied to the display device. Therefore, the present invention can provide a display device with a touch panel and has high visibility of the screen image as well as high reliability.

In addition, since the conductive main frame 32b plays the role also as the second electrode 31, a process to form the second electrode 31 on the main frame 32 can be omitted. Thus, the manufacturing process of a display device 1001 is shorten, so that a cost reduction can be achieved. Also, with the main frame 32b being grounded, the liquid crystal panel 4 covered with the main frame 32b is electrically shielded, so that noise can be prevented from overlapping with signals in the internal wirings (source line, gate line, etc.) of the liquid crystal panel 4.

Third Embodiment

In Embodiments 1 and 2, configurations are described in which the first electrode 14 is formed on the back surface 13r of the touch sensor substrate 13. In the present third embodiment, a configuration will be described in which a first electrode 141 is formed on the front surface of a touch sensor substrate 13b. The first electrode 141 can be formed in the same process or in a sequential process as those of the row sensor electrodes 132, the column sensor electrodes 134, etc. Thus, the manufacturing process of the display device is shortened, so that a cost reduction can be achieved.

Figure 12:
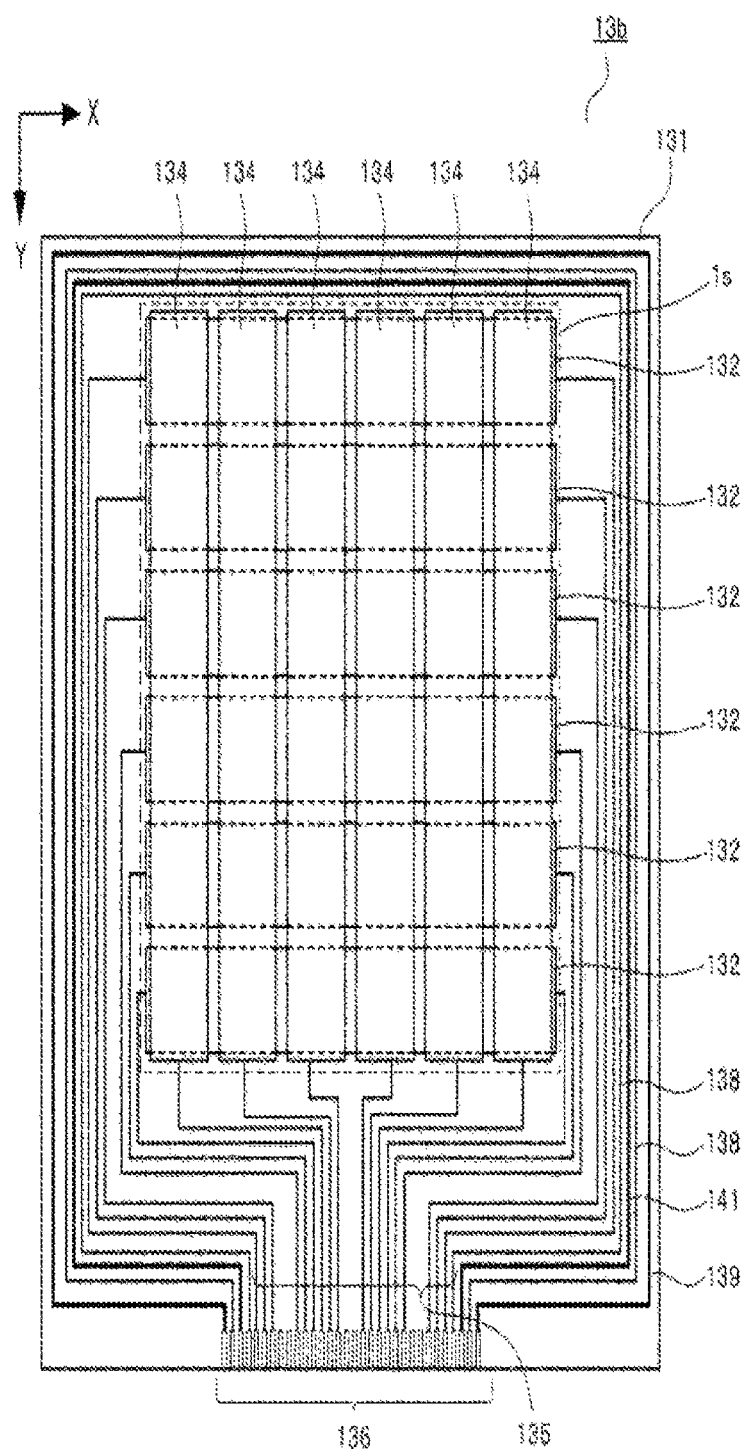
FIG. 12 is a plan view of a touch sensor substrate 13b according to a third embodiment of the present invention.
Figure 13:
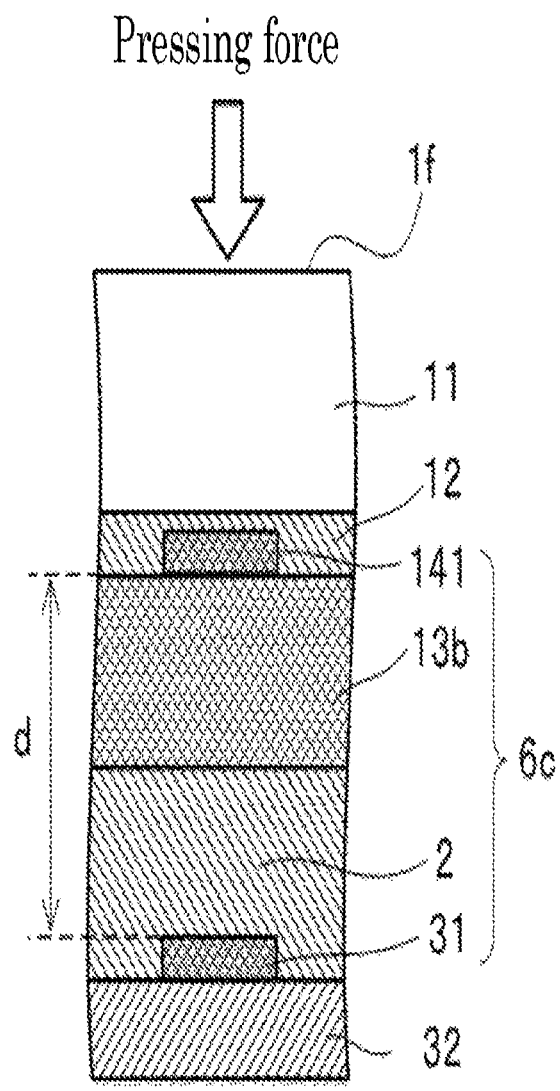
FIG. 13 is a cross-sectional view of a structure around a pressure-sensitive sensor 6c.
Figure 14:
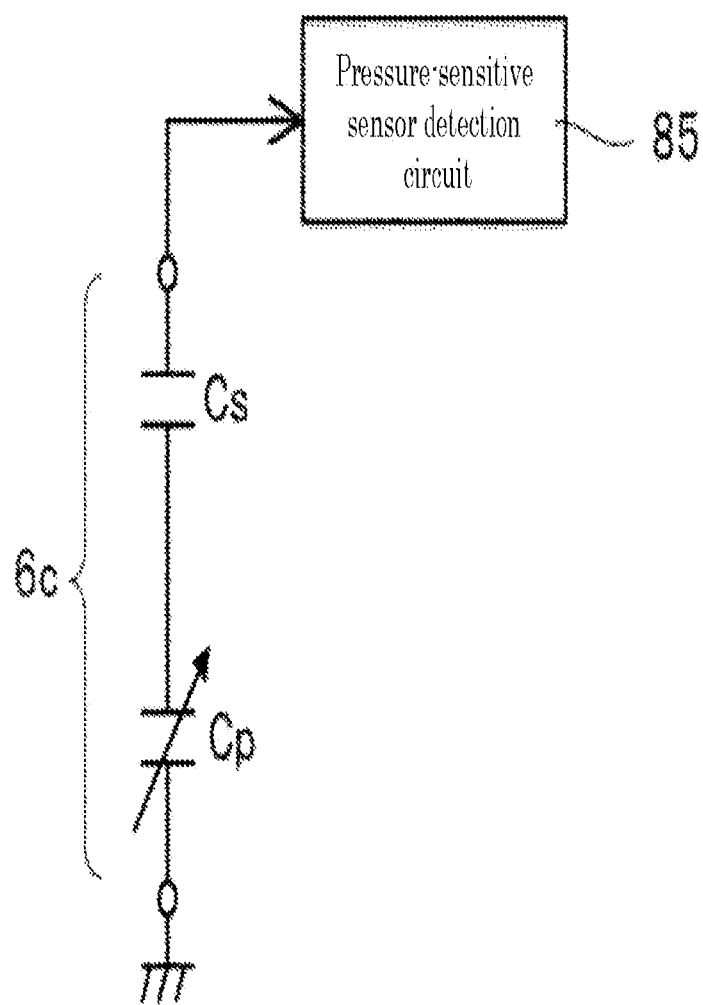
FIG. 14 is a diagram showing an equivalent circuit and an electrical connection of the pressure-sensitive sensor 6c.

Referring to FIGS. 12 to 14, a structure of the display device according to the third embodiment will be described. FIG. 12 is a plan view of the front side of the touch sensor substrate 13b of the display device according to the third embodiment. FIG. 13 is a cross-sectional view of a structure around a pressure-sensitive sensor 6c. FIG. 14 is a diagram showing an electrical connection of the pressure-sensitive sensor 6c. In FIGS. 12 to 14, the components given the same numerals or the same signs as used in FIGS. 1 to 9 each are the same or equivalent component shown in the first embodiment, and thus the detailed description will be omitted.

Referring to FIG. 12, a structure of the touch sensor substrate 13b according to the third embodiment will be described. The first electrode 141 is formed in a loop in an inner peripheral portion of the front surface of the touch sensor substrate 13b and both ends of the first electrode 141 each are connected to one of the connecting terminals 136. Two shielded wirings 138 are formed in a loop in the inner peripheral portion of the front surface of the touch sensor substrate 13b and formed one by one on the both sides of the first electrode 141. Both ends of the two wirings are connected to the connecting terminals 136. Further, voltage is applied to the shielded wirings 138 via the connecting terminals 136 and the same potential as that of the first electrode 141 is maintained. A guard electrode 139 is formed in a loop on the outer peripheral side with respect to the first electrode 141 and the shielded wirings 138, and the both ends each are connected to one of the connecting terminals 136. In addition, the guard electrode 139 is grounded via the connecting terminals 136. In the present third embodiment, the inner peripheral portion of the touch panel 1 is a portion around the touch sensor portion 1s of the front surface of the touch sensor substrate 13b.

Referring to FIG. 13, the first electrode 141, the second electrode 31, the dielectric sheet 2 sandwiched between these electrodes, and the touch sensor substrate 13b constitute the pressure-sensitive sensor 6c. In the present third embodiment, the distance d indicates the distance between the first electrode 141 and the second electrode 31. Note that, in FIG. 13, an example in which the first electrode 141 is formed on the touch sensor substrate 13b is shown. Depending on a manufacturing method, the first electrode 141 may be formed between the front surface of the transparent substrate 131 and the front surface of the protective film 137.

Referring to FIG. 14, the capacitance of the pressure-sensitive sensor 6c is indicated as a serial connection of the capacitance Cs and the capacitance Cp. The capacitance Cs depends on the thickness and the dielectric constant of the transparent substrate 131.

As is the case with the first embodiment, the capacitance Cp depends on the thickness and the dielectric constant of the dielectric sheet 2. Further, the first electrode 141 is connected to the pressure-sensitive sensor detection circuit 85, that is, one end of the capacitance Cs is connected to the pressure-sensitive sensor detection circuit 85, and one end of the capacitance Cp is grounded.

As is the case with the first embodiment, since the dielectric sheet 2 is elastic, by detecting the change amount ΔCp depending on the pressing force via the pressure-sensitive sensor detection circuit 85, the pressing force applied to the front surface 1f of the touch panel 1 by the operation element can be detected.

The functions of the shielded wirings 138 and the guard electrode 139 will be described.

By applying the same potential as that of the first electrode 141 to the shielded wirings 138, sensitivity deterioration of the pressure-sensitive sensor 6c caused by a parasitic capacitance between the first electrode 141 and the row sensor electrodes 132 or the column sensor electrodes 134, etc. can be prevented. Further, by grounding the guard electrode 139, static electricity (for example, introduced through operator's fingers) introduced on the front surface of the touch panel can be prevented from flowing through glass edge sides and discharging toward the sensor electrodes, and thereby breakage can be prevented.

The first electrode 141, the shielded wirings 138, and the guard electrode 139 can be formed of a transparent conductive film made of, for example, indium tin oxide (ITO), a metal wiring, and other materials. Thus, in forming thereof, as is the case with the row sensor electrodes 132 and the column sensor electrodes 134, a manufacturing method can be used in which lithography and etching are used after depositing the transparent conductive film and the fine metal mesh wirings etc. on the transparent substrate 13. This means that simultaneous or sequential forming with the row sensor electrodes 132 or the column sensor electrodes 134 is possible. Therefore, there is no need to form the second electrode 31 on the back surface 13r of the touch sensor substrate 13 otherwise. Thus, the manufacturing process of the display device is shortened, so that a cost reduction can be achieved.

In addition, the operation to determine whether the operation element touches the front surface 1f of the touch panel 1 and to output the touch coordinates is the same as in the first embodiment.

In this way, according to the present third embodiment, as is the case with Embodiments 1 and 2, a display device that prevents erroneous detection of the touch coordinates can be obtained. Further, the display device is provided with a structure in which the touch panel 1 is closely adhered and is held by the frame 3b and the liquid crystal panel 4 via the dielectric sheet 2. In other words, the back surface 13r of the touch sensor substrate 13b and the display surface 4f of the liquid crystal panel 4 are adhered via the dielectric sheet 2 without a air gap between them. Further, the refractive index of the dielectric sheet 2 is set to be substantially the same as those of the materials forming the back surface 13r of the touch sensor substrate 13b and the display surface 4f of the liquid crystal panel 4. Thus, degradation in the visibility of the display screen in the liquid crystal panel 4 due to multiple reflection of visible light between the back surface 1r of the touch panel 1 and the display surface 4f of the liquid crystal panel 4 does not take place.

The back surface 13r of the touch sensor substrate 13b is adhered not only to the display surface 4f of the liquid crystal panel 4, but also to the marginal portion 3e of the frame 3b, via the dielectric sheet 2. Being capable of holding the touch panel 1, the dielectric sheet 2 can prevent excessive stress on the pressure-sensitive sensor even when vibration or shock is applied to the display device. Therefore, the present invention can provide a display device with a touch panel and has high visibility of the screen image as well as high reliability.

Further, the first electrode 141, the shielded wirings 138, and the guard electrode 139 can be formed simultaneously or sequentially with the row sensor electrodes 132 or the column sensor electrodes 134. Therefore, there is no need to form the first electrode 14 on the back surface 13r of the touch sensor substrate 13 otherwise. Thus, the manufacturing process of the display device is shortened, so that a cost reduction can be achieved.

Fourth Embodiment

In Embodiments 1 and 2, a structure is described in which the first electrode 14 is formed on the back surface 13r of the touch sensor substrate 13. In the third embodiment, a structure is described in which the first electrode 141 is disposed on the front surface of the touch sensor substrate 13b. In the present fourth embodiment, a structure will be described in which a first electrode 14b is disposed on the back surface marginal portion 11r of the protective plate 11. Note that, the process to form a first electrode 14b on the back surface marginal portion 11r of the protective plate 11 and the process to form the row sensor electrodes 132 and the column sensor electrodes 134, etc. on the touch sensor substrate 13 can be performed in parallel. Thus, the manufacturing time is shortened, so that a cost reduction can be achieved.

Figure 15:
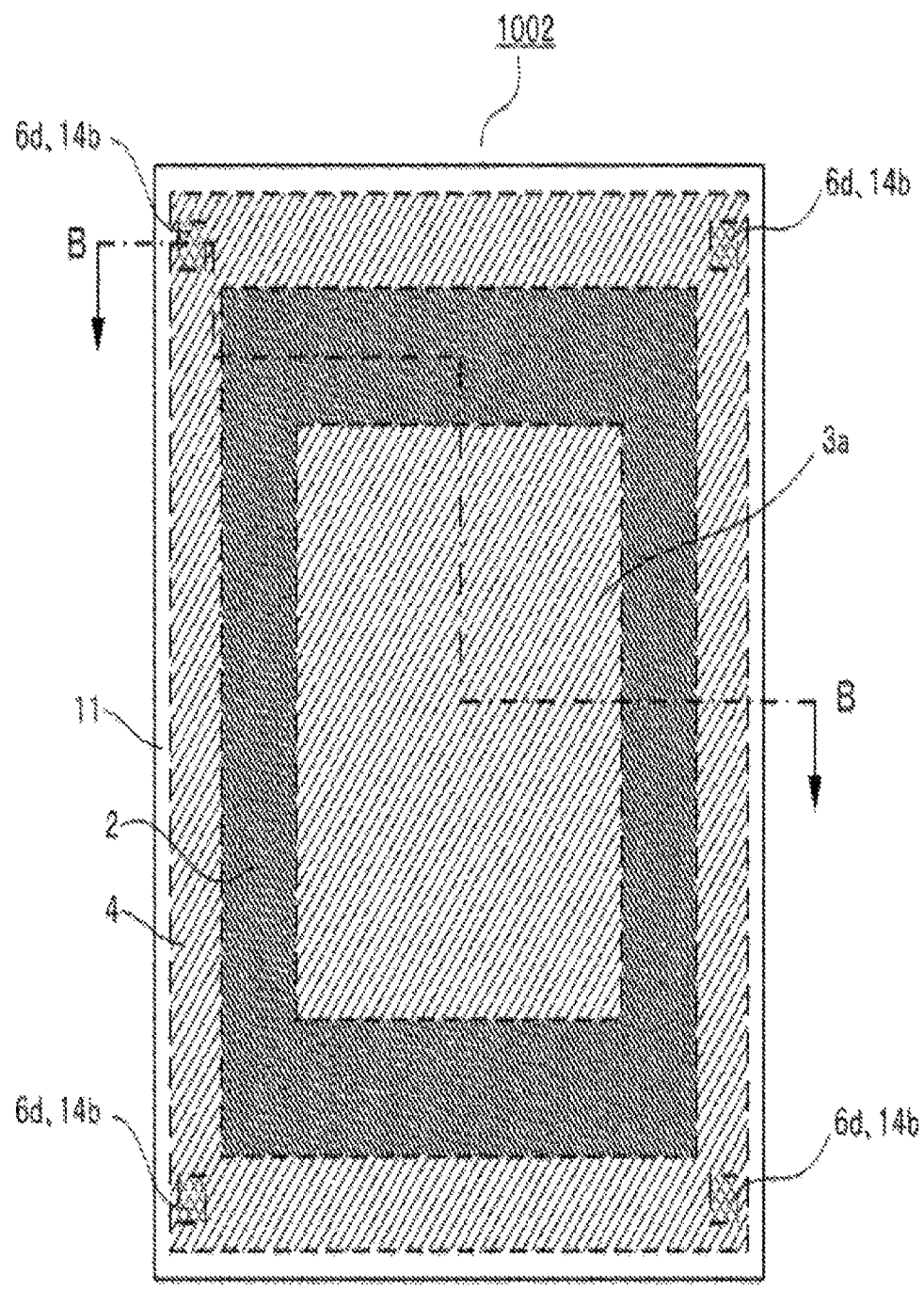
FIG. 15 is a plan view of a display device 1002 according to a fourth embodiment of the present invention.
Figure 16:
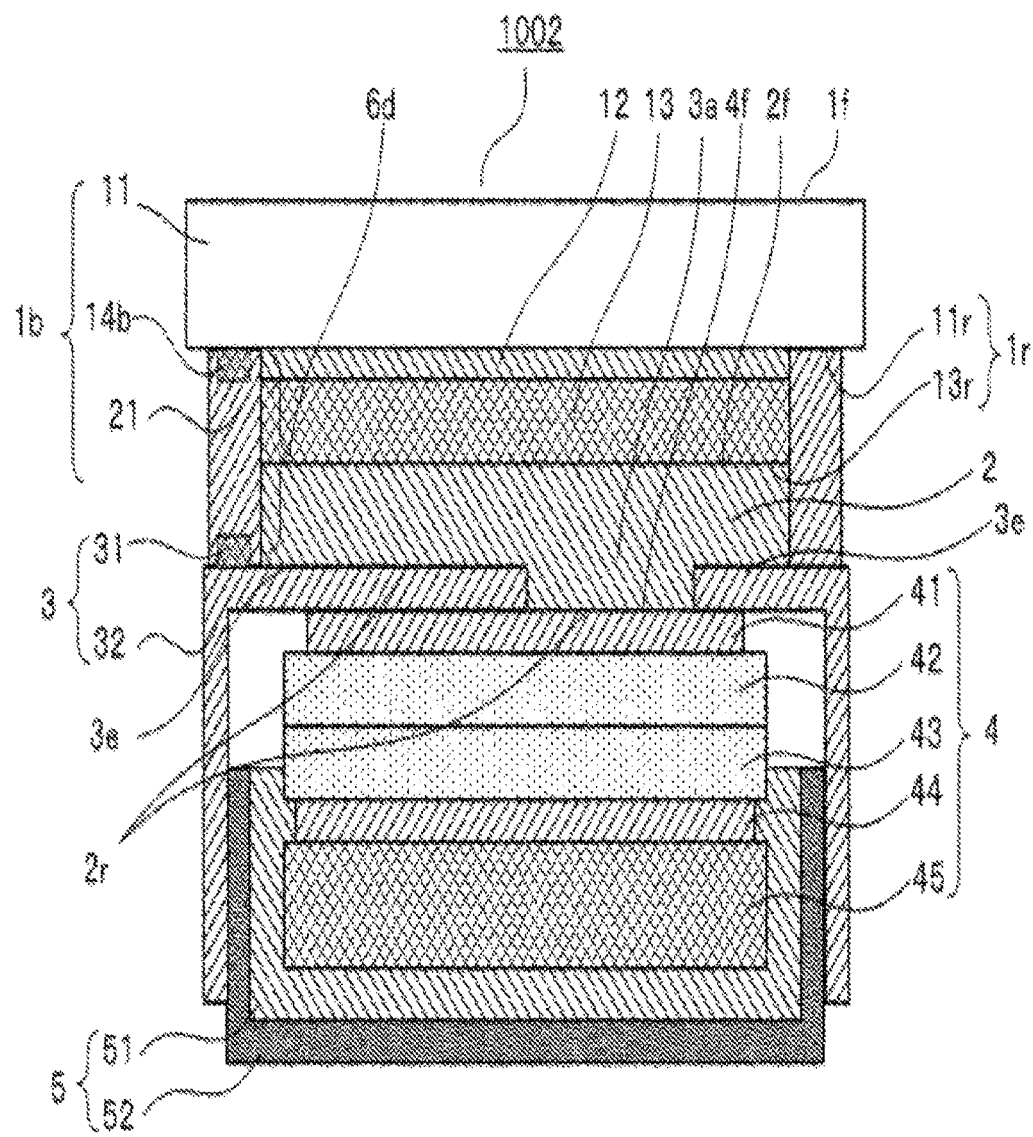
FIG. 16 is a cross-sectional view of the display device 1002.
Figure 17:
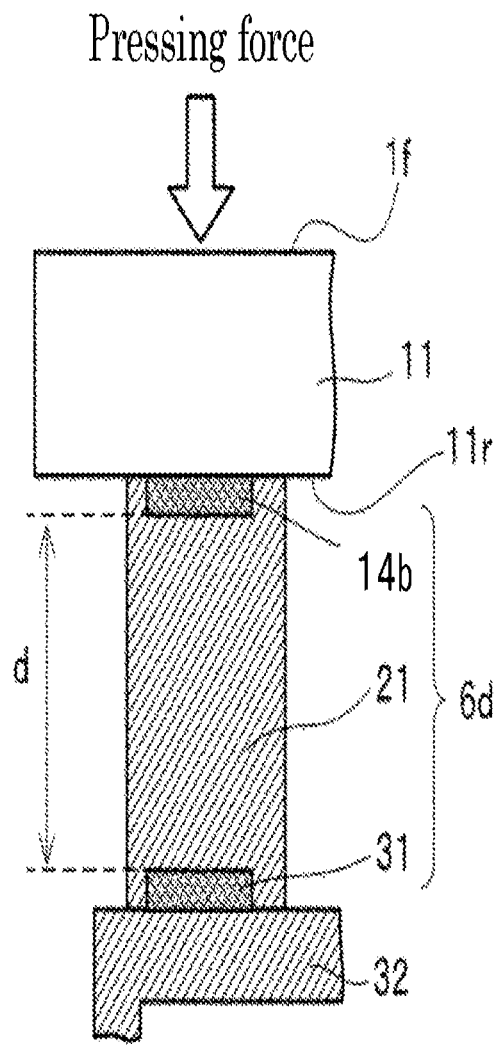
FIG. 17 is a cross-sectional view of a structure around a pressure-sensitive sensor 6d.

Referring to FIGS. 15 to 17, a structure of a display device 1002 according to the fourth embodiment will be described. FIG. 15 is a plan view showing the structure of the display device 1002 according to the fourth embodiment. Note that, FIG. 16 is a cross-sectional view thereof taken along the chain line B-B shown in FIG. 15. FIG. 17 is a cross-sectional view showing a structure around a pressure-sensitive sensor 6d. In FIGS. 15 to 17, the components given the same numerals or the same signs as used in FIGS. 1 to 9 each are the same or equivalent component shown in the first embodiment, and thus, the detailed description will be omitted.

Referring to FIGS. 15 and 16, the first electrode 14b is disposed on the back surface marginal portion 11r of the protective plate 11. In addition, a second electrode 31 is disposed on the marginal portion 3e of the main frame 32 so as to face the first electrode 14b. A marginal dielectric sheet 21 is disposed between the first electrode 14b and the second electrode 31. Further, in the present fourth embodiment, the inner peripheral portion of the touch panel 1 is a portion in the back surface marginal portion 11r of the protective plate 11 and the portion facing the marginal portion 3e of the frame 3 via the marginal dielectric sheet 21. As is the case with the dielectric sheet 2, the marginal dielectric sheet 21 made of an OCA or an OCR can be formed at the same time with the dielectric sheet 2. Referring to FIG. 17, the first electrode 14b, the second electrode 31, and the marginal dielectric sheet 21 sandwiched between them constitute the pressure-sensitive sensor 6d. In the present fourth embodiment, the distance d indicates the distance between the first electrode 14b and the second electrode 31.

As is the case with the first embodiment, since the marginal dielectric sheet 21 is elastic, the change amount ΔCp in the capacitance Cp of the pressure-sensitive sensor 6d depending on the pressing force can be detected by the pressure-sensitive sensor detection circuit 85.

Note that, the operation to determine whether the operation element touches the front surface 1f of the touch panel 1 and to output the touch coordinates is the same as in the first embodiment.

In this way, according to the present fourth embodiment, as in the first embodiment to the third embodiment, a display device that prevents erroneous detection of the touch coordinates can be provided. Further, the display device according to the present fourth embodiment is provided with a structure in which the touch panel 1 is closely adhered and is held by the frame 3b and the liquid crystal panel 4 via the dielectric sheet 2. In other words, the back surface 13r of the touch sensor substrate 13 and the display surface 4f of the liquid crystal panel 4 are adhered via the dielectric sheet 2 without a air gap between them. Further, the refractive index of the dielectric sheet 2 is set to be substantially the same as those of the materials forming the back surface 13r of the touch sensor substrate 13 and the display surface 4f of the liquid crystal panel 4. Thus, degradation in the visibility of the display screen in the liquid crystal panel 4 due to multiple reflection of visible light between the back surface 1r of the touch panel 1 and the display surface 4f of the liquid crystal panel 4 does not take place.

The back surface 13r of the touch sensor substrate 13 is adhered not only to the display surface 4f of the liquid crystal panel 4, but also to the marginal portion 3e of the frame 3, via the dielectric sheet 2. Being capable of holding the touch panel 1, the dielectric sheet 2 can prevent excessive stress on the pressure-sensitive sensor even when vibration or shock is applied to the display device. Therefore, the present invention can provide a display device with a touch panel and has high visibility of the screen image as well as high reliability.

Note that, the process to form the first electrode 14b on the back surface marginal portion 11r of the protective plate 11 and the process to form the row sensor electrodes 132 and the column sensor electrodes 134, etc. on the touch sensor substrate 13 can be performed in parallel. Thus, the manufacturing time of the display device is shortened, so that a cost reduction can be achieved.

Fifth Embodiment

In Embodiments 1 and 2, a structure is described in which the first electrode 14 is formed at each of the four corners in the inner peripheral portion of the back surface 13r of the touch sensor substrate 13. In the fourth embodiment, a structure is described in which the first electrode 14 is formed at each of the four corners on the back surface marginal portion 11r of the protective plate 11. In the present fifth embodiment, a structure will be described in which a first electrode 14c is disposed in a loop shape in the inner peripheral portion of the back surface 1r of the touch panel 1.

Figure 18:
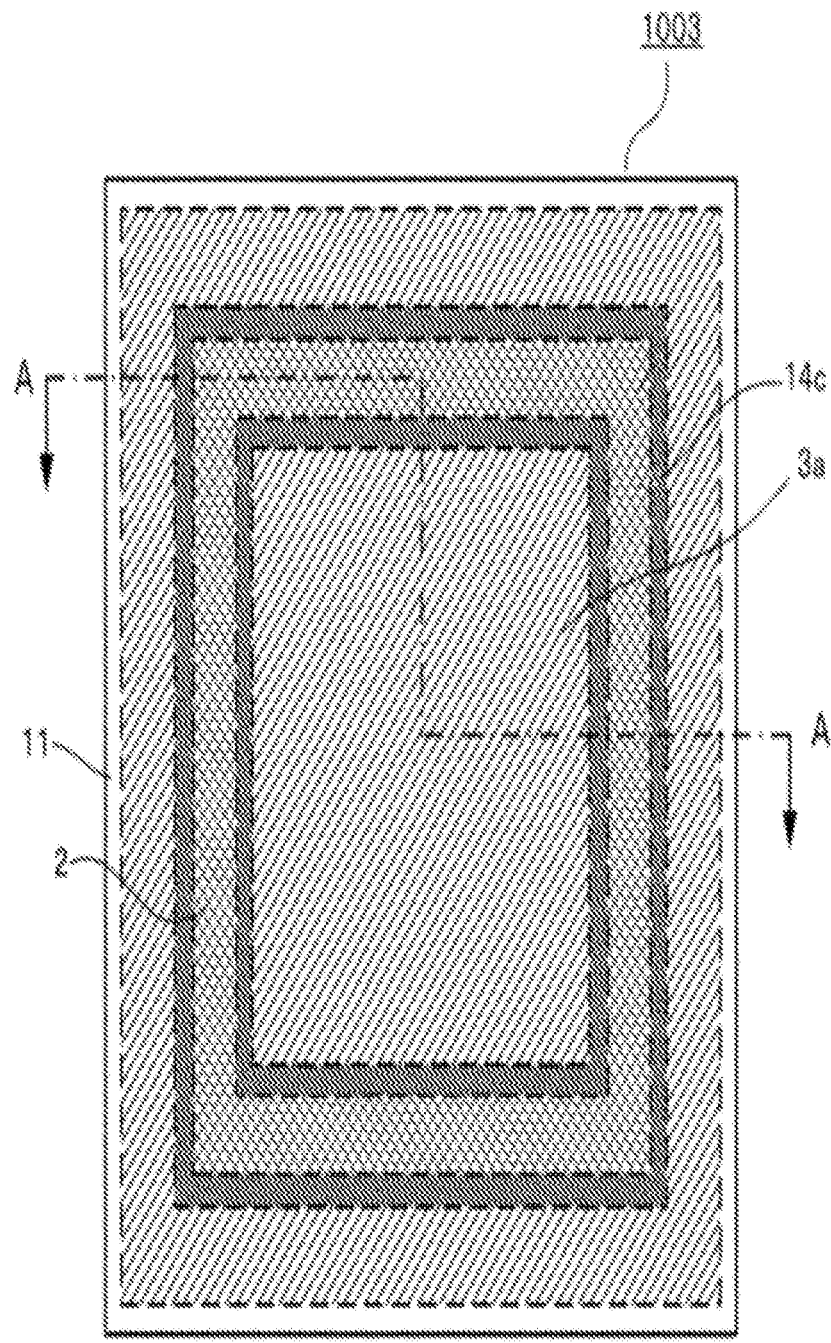
FIG. 18 is a plan view of a display device 1003 according to a fifth embodiment of the present invention.
Figure 19:
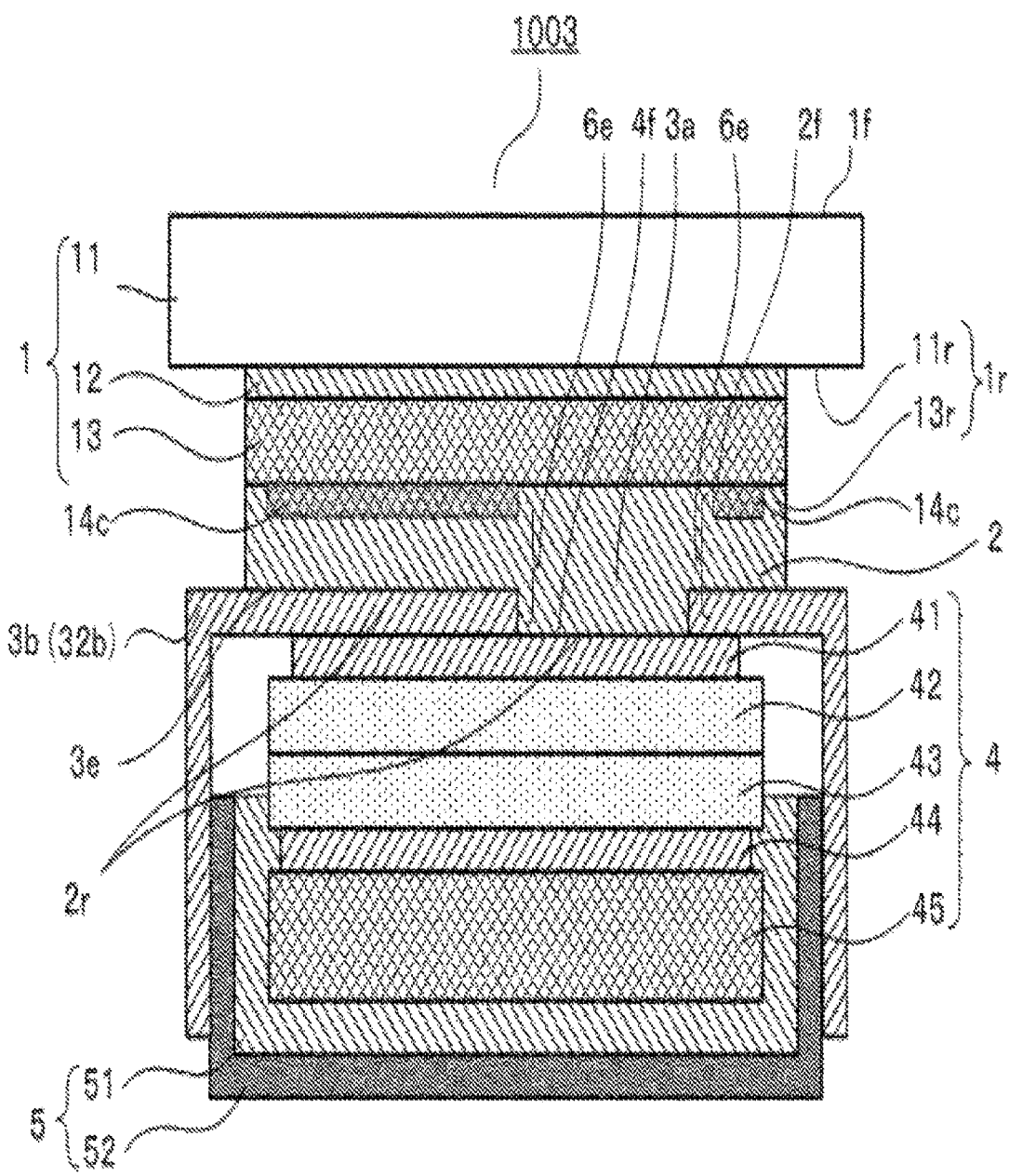
FIG. 19 is a cross-sectional view of the display device 1003.

By disposing the first electrode 14c as a loop, the area thereof can be increased, compared with those of the first electrode according to the first, second, or fourth embodiment, and thus, the capacitance Cp and its change amount ΔCp of a pressure-sensitive sensor 6e become larger, so that the sensitivity of the pressure-sensitive sensor 6e can be increased. Referring to FIG. 18 and FIG. 19, a structure of a display device 1003 according to the fifth embodiment will be described. FIG. 18 is a plan view showing the structure of the display device 1003 according to the fifth embodiment. FIG. 19 is a cross-sectional view thereof taken along the chain line A-A shown in FIG. 18. In FIG. 18 and FIG. 19, the components given the same numerals or the same signs as used in FIG. 10 and FIG. 11 each are the same or equivalent component shown in the first embodiment or 2, and thus the detailed description will be omitted.

Referring to FIG. 18 and FIG. 19, the first electrode 14c disposed as a loop in the inner peripheral portion of the back surface 13r of the touch sensor substrate 13, the main frame 32b also serving as a second electrode, and the dielectric sheet 2 sandwiched between them constitute the pressure-sensitive sensor 6e.

Figure 20:
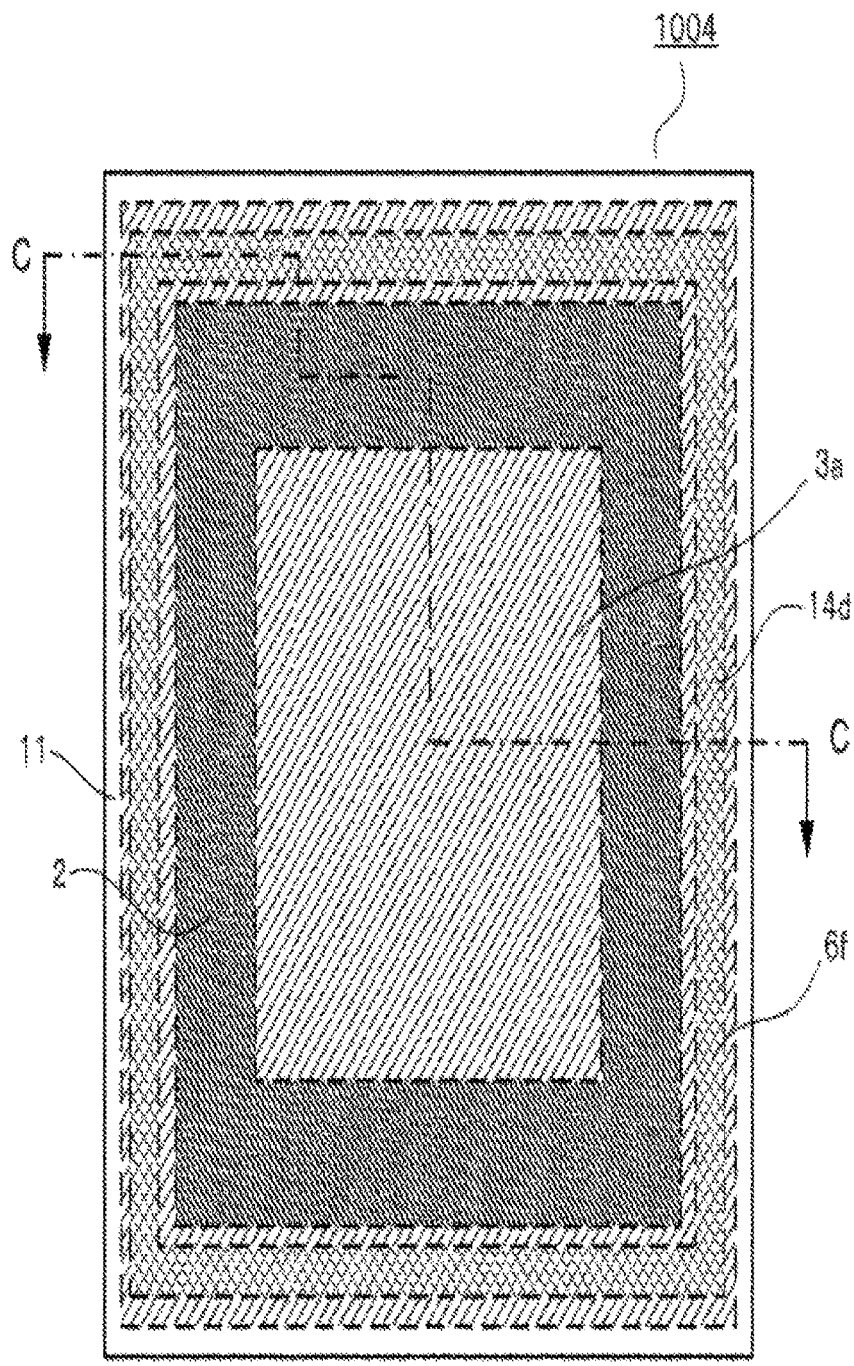
FIG. 20 is a plan view of another display device 1004 according to the fifth embodiment of the present invention that is different from the display device 1003.
Figure 21:
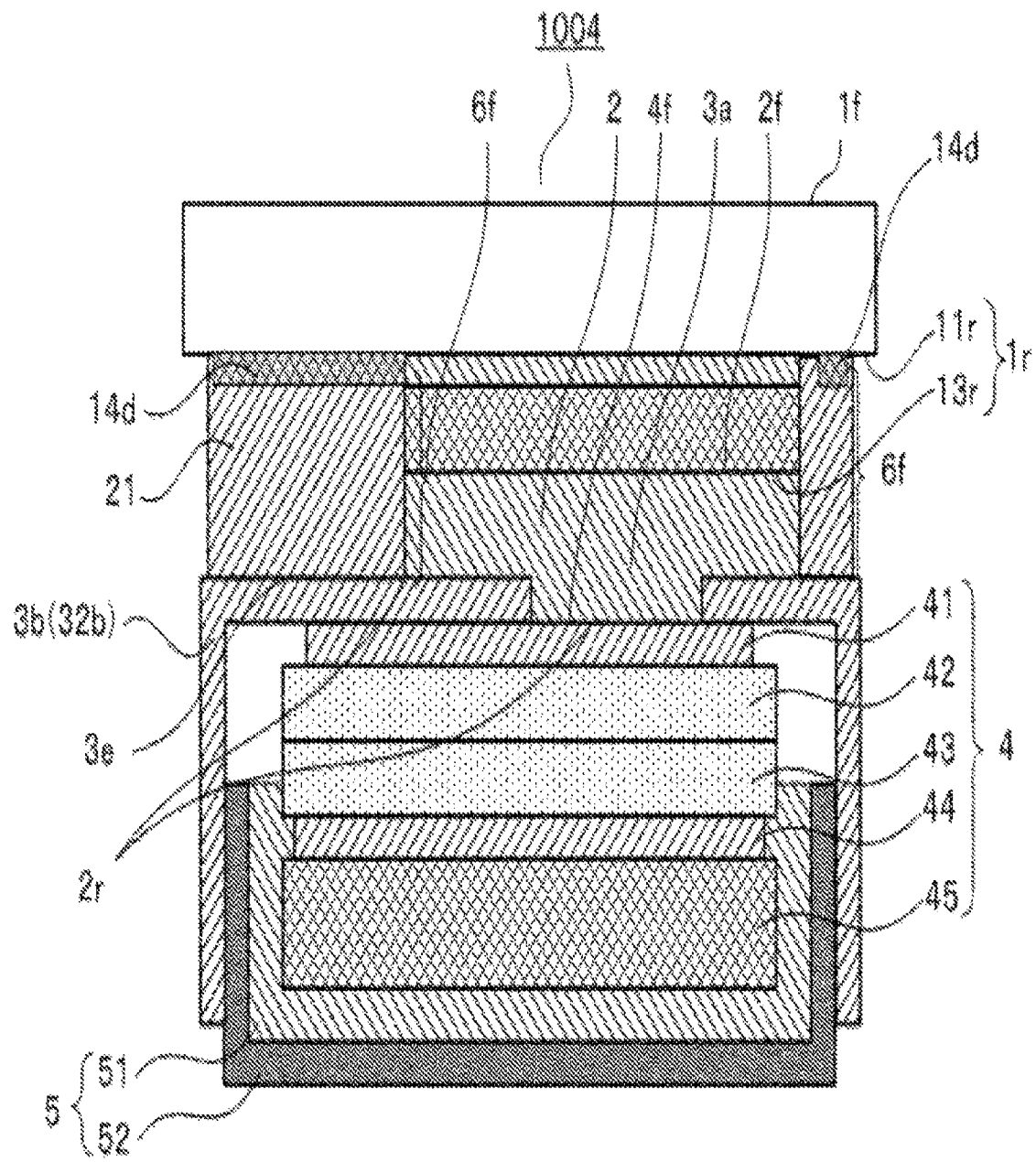
FIG. 21 is a cross-sectional view of the display device 1004.

Next, referring to FIG. 20 and FIG. 21, a structure of a display device 1004 according to the fifth embodiment that is different from the display device 1003 will be described. FIG. 20 is a plan view showing a structure of the display device 1004 according to the fifth embodiment. Note that, FIG. 21 is a cross-sectional view thereof taken along the chain line C-C in FIG. 20. As is the case with the display device 1003, by disposing a first electrode 14d as a loop, the area thereof can be increased, compared with those of the first electrode according to the first, second, or fourth embodiment. Thus, the capacitance Cp and its change amount ΔCp of a pressure-sensitive sensor 6f become larger, so that the sensitivity of the pressure-sensitive sensor 6f can be increased. In FIG. 20 and FIG. 21, the components given the same numerals or the same signs as used in FIG. 10, FIG. 15 and FIG. 16 each are the same or equivalent component shown in the second embodiment or 4, and thus the detailed description will be omitted. Referring to FIG. 20 and FIG. 21, the first electrode 14d disposed as a loop in the back surface marginal portion 11r of the protective plate 11, the main frame 32b also serving as the second electrode, and the marginal dielectric sheet 21 sandwiched between the first electrode 14d and the main frame 32b constitute the pressure-sensitive sensor 6f.

Note that, the operation to determine whether the operation element touches the front surface 1f of the touch panel 1 and to output the touch coordinates is the same as in the first embodiment.

In this way, according to the present fifth embodiment, as is the case with the first to fourth embodiments, a display device that prevents erroneous detection of the touch coordinates can be obtained. In addition, the display device according to the present fifth embodiment is provided with a structure in which the touch panel 1 is closely adhered and is held by the frame 3 and the liquid crystal panel 4 via the dielectric sheet 2. In other words, the back surface 13r of the touch sensor substrate 13 and the display surface 4f of the liquid crystal panel 4 are adhered via the dielectric sheet 2 without a air gap between them. Further, the refractive index of the dielectric sheet 2 is set to be substantially the same as those of the materials forming the back surface 13r of the touch sensor substrate 13 and the display surface 4f of the liquid crystal panel 4. Thus, degradation in the visibility of the display screen in the liquid crystal panel 4 due to multiple reflection of visible light between the back surface 1r of the touch panel 1 and the display surface 4f of the liquid crystal panel 4 does not take place.

The back surface 13r of the touch sensor substrate 13 is adhered not only to the display surface 4f of the liquid crystal panel 4, but also to the marginal portion 3e of the frame 3b, via the dielectric sheet 2. Being capable of holding the touch panel 1, the dielectric sheet 2 can prevent excessive stress on the pressure-sensitive sensor even when vibration or shock is applied to the display device. Therefore, the present invention can provide a display device with a touch panel and has high visibility of the screen image as well as high reliability.

By disposing the first electrode 14c and the first electrode 14d as a loop, the areas thereof can be increased, compared with those of the first electrode according to the first, second, and fourth embodiment. Thus, the capacitance Cp of the pressure-sensitive sensors 6e and 6f can be increased. Therefore, its change amount ΔCp become larger, so that the sensitivity of the pressure-sensitive sensor 6e can be increased.

Sixth Embodiment

In the first embodiment, a structure is described in which the second electrode 31 is formed on the marginal portion 3e of the frame 3. In the present sixth embodiment, a structure will be described in which a second electrode 31b is disposed on a back surface 3er of the marginal portion 3e of the frame 3. Because wirings (not illustrated) to be connected to the second electrode 31b can be disposed inside the space surrounded by the frame 3 and the rear cover 5, the wirings to be connected to the second electrode 31b is not exposed on the marginal portion 3e of the frame 3, and also process such as a through-hole process into the main frame 32 to pass the wirings to the second electrode 31b is not required, both of which are necessary in the case of the second electrode 31 to be formed on the marginal portion 3e of the frame 3.

Figure 22:
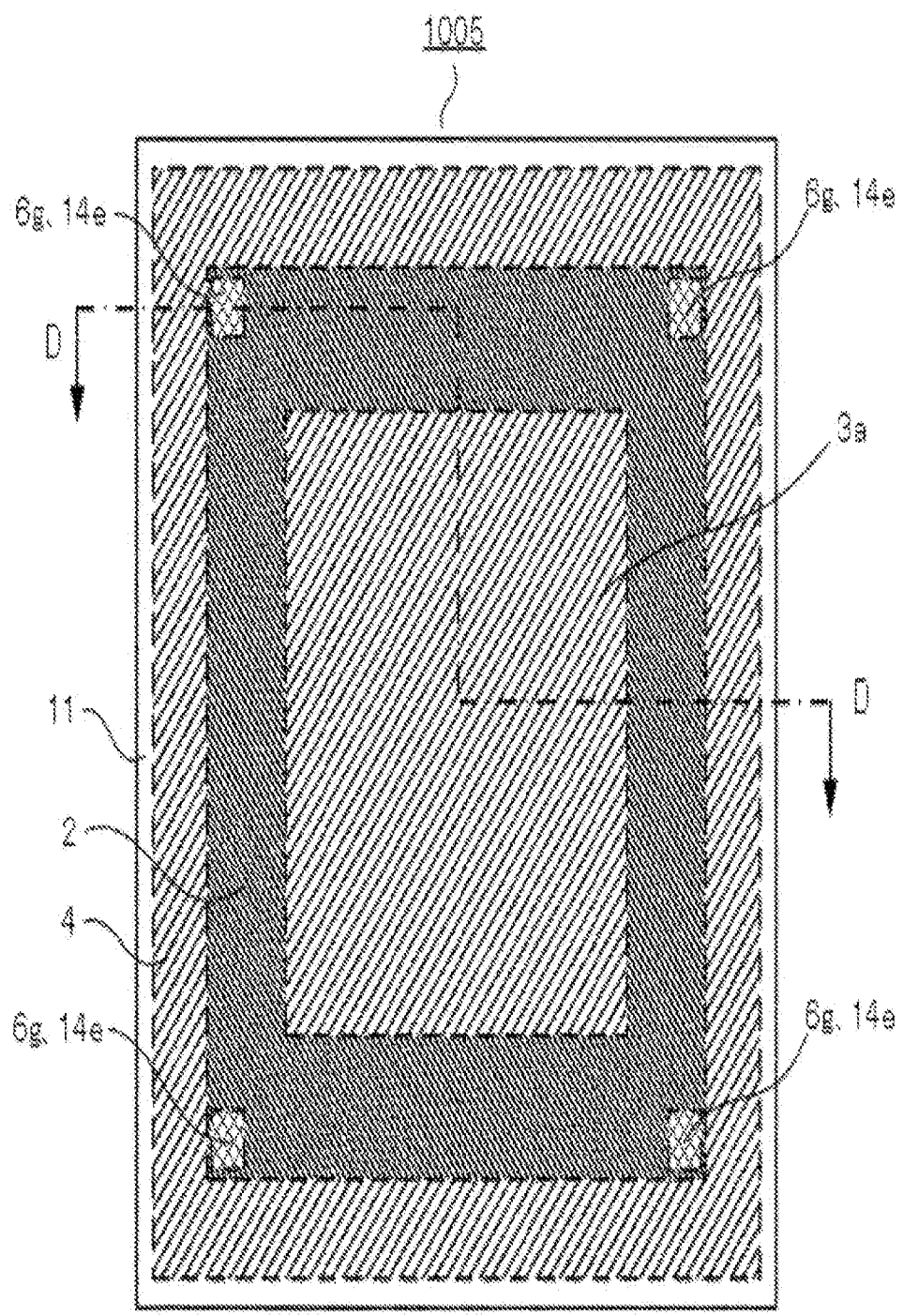
FIG. 22 is a plan view of a display device 1005 according to a sixth embodiment of the present invention.
Figure 23:
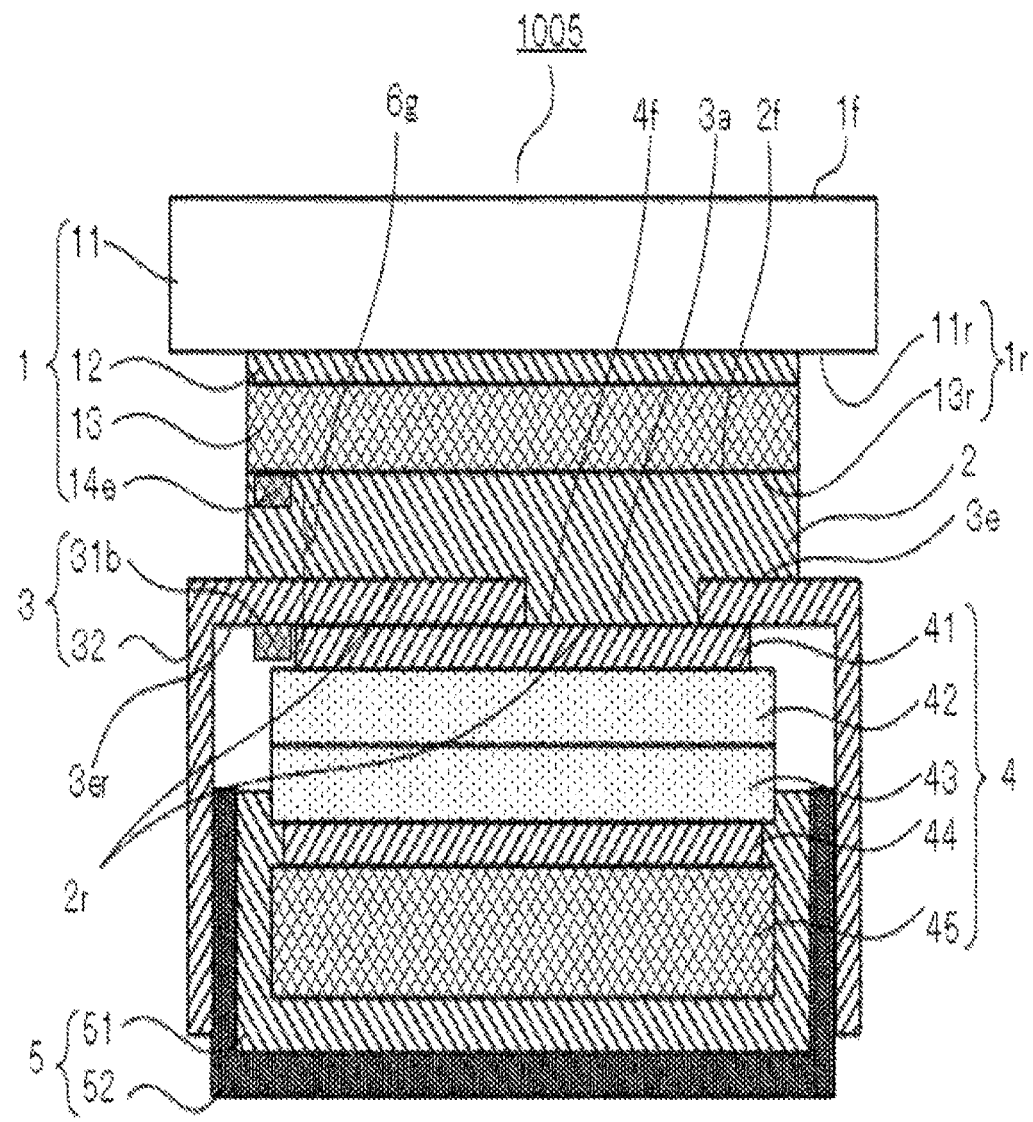
FIG. 23 is a cross-sectional view of the display device 1005.

Referring to FIG. 22 and FIG. 23, a structure of a display device 1005 according to the present sixth embodiment will be described. FIG. 22 is a plan view showing the structure of the display device 1005 according to the present sixth embodiment. FIG. 23 is a cross-sectional view thereof taken along the chain line D-D shown in FIG. 22. In FIG. 22 and FIG. 23, the components given the same numerals or the same signs as used in FIG. 1 and FIG. 2 each are the same or equivalent component shown in the first embodiment, and thus the detailed description will be omitted.

Referring to FIG. 22 and FIG. 23, a first electrode 14e disposed on the inner peripheral portion of the back surface 13r of the touch sensor substrate 13, the second electrode 31b formed on the back surface 3er of the marginal portion 3e of the frame 3, and the dielectric sheet 2 sandwiched between the first electrode 14e and the second electrode 31 constitute a pressure-sensitive sensor 6g.

Note that, the operation to determine whether the operation element touches the front surface 1f of the touch panel 1 and to output the touch coordinates is the same as in the first embodiment.

In this way, according to the present sixth embodiment, as is the case with the first to fifth embodiments, a display device that prevents erroneous detection of the touch coordinates can be obtained. In addition, the display device according to the present sixth embodiment is provided with a structure in which the touch panel 1 is closely adhered and is held by the frame 3 and the liquid crystal panel 4 via the dielectric sheet 2. In other words, the back surface 13r of the touch sensor substrate 13 and the display surface 4f of the liquid crystal panel 4 are adhered via the dielectric sheet 2 without a air gap between them. Further, the refractive index of the dielectric sheet 2 is set to be substantially the same as those of the materials forming the back surface 13r of the touch sensor substrate 13 and the display surface 4f of the liquid crystal panel 4. Thus, degradation in the visibility of the display screen in the liquid crystal panel 4 due to multiple reflection of visible light between the back surface 1r of the touch panel 1 and the display surface 4f of the liquid crystal panel 4 does not take place.

The back surface 13r of the touch sensor substrate 13 is adhered not only to the display surface 4f of the liquid crystal panel 4, but also to the marginal portion 3e of the frame 3b, via the dielectric sheet 2. Being capable of holding the touch panel 1, the dielectric sheet 2 can prevent excessive stress on the pressure-sensitive sensor even when vibration or shock is applied to the display device. Therefore, the present invention can provide a display device with a touch panel and has high screen visibility as well as high reliability.

Further, by disposing the second electrode 31b on the back surface 3er of the marginal portion 3e of the frame 3, it becomes possible to dispose the wirings (not illustrated) to be connected to the second electrode 31b inside the space surrounded by the frame 3 and the rear cover 5. As a result, the wirings connected to the second electrode 31b are not exposed on the marginal portion 3e of the frame 3, and also, the process such as a through-hole process into the main frame 32 is not required to pass the wirings to the second electrode 31b, both of which are necessary in the case of the second electrode 31 to be formed on the marginal portion 3e of the frame 3. This prevents the production process of the display device from being complicated. Thus, the manufacturing time is shortened, so that a cost reduction can be achieved.

In addition, by forming the main frame 32 with a non-conductive material which is lighter than metal, the display device can reduce the weight. Such non-conductive materials include an acrylic resin and a polycarbonate resin.

Note that, in the descriptions of the first to sixth embodiments, a liquid crystal panel 4 is taken as an example of a display panel. The present invention, however, is not limited by the type of the display panel. For example, among the display panels, there are panels such as an organic electro luminescence (EL) panel, a plasma panel, and a segment panel.

In addition, in the first to sixth embodiments, a mutual capacitance method is taken as an example for the touch panel from among the capacitance methods. The present invention, however, is not limited by the type of method for the touch panel. For example, the types of method for the touch panel include a resistive film type, a surface acoustic wave type, and an infrared type.

In addition, in the first to sixth embodiments, structures in which the first electrodes: 14, 141, and 14b to 14e are disposed as a loop or at the corners, in the inner periphery of the back surface 1r of the touch panel 1, are illustrated and described. The present invention, however, is not limited to the above and to the shape of the electrode as long as the electrode is disposed in the inner peripheral portion of the back surface 1r of the touch panel 1. Further, a structure is illustrated and described in which the first electrode and the second electrode face each other. However, as long as the capacitance between the first electrode and the second electrode changes in accordance with the pressing force, it is not necessary that the first electrode face the second electrode in the structure. For example, in a plan view of the first electrode and the second electrode, the first electrode and the second electrode may be disposed next to each other.

In addition, in the first to sixth embodiments, the structures are described in which the dielectric sheet 2 is sandwiched between the first electrode and the second electrode. However, in a case where the sensitivity of the pressure-sensitive sensor is high enough, it is not necessary that the dielectric sheet 2 be sandwiched between the first electrode and the second electrode. For example, in a case where the areas for the first electrode and the second electrode are large enough or in a case where the distance between the first electrode and the second electrode can be shortened, the gap between the first electrode and the second electrode may be left as a air gap.

Furthermore, within the scope of the invention, each embodiment can be freely combined, or each embodiment can properly be modified or be omitted.

DESCRIPTION OF SYMBOLS 1, 1b touch panel
1s touch sensor portion
2 dielectric sheet
3, 3b frame
3a opening
3e marginal portion
4 liquid crystal panel
6, 6b to 6g pressure-sensitive sensor
11 protective plate
13, 13b touch sensor substrate 14, 14b to 14e, 141 first electrode
31, 31b second electrode
1000 to 1005 display device

The invention claimed is:

1. A display device having a central axis, the display device comprising:
   a touch panel having a touch sensor portion and a first electrode, wherein the touch sensor portion is in a central portion of the touch panel, the central portion includes an inner peripheral portion, and the first electrode is in the inner peripheral portion;
   a dielectric having a front surface that is in direct contact with a back surface of the touch panel;
   a frame that frames a display panel, the frame having sides, a front overhang and a second electrode, wherein the front overhang extends toward the central axis to create an opening on a central portion of the front overhang, and the front overhang is in direct contact with a back surface of the dielectric in a marginal portion of the front overhang; and
   the display panel having a display surface to display a screen image, the display surface is in direct contact with the back surface of the dielectric in the opening of the front overhang, wherein
   the marginal portion of the front overhang is between, and in contact with both off the dielectric and the display panel, and
   the first electrode and the second electrode constitute a pressure-sensitive sensor.

2. The display device according to claim 1, wherein the pressure-sensitive sensor detects capacitance between the first electrode and the second electrode.

3. The display device according to claim 1, wherein the first electrode comprises a plurality of electrodes.

4. The display device according to claim 1, wherein the first electrode is formed in a loop in the inner peripheral portion of the touch panel.

5. The display device according to claim 1, wherein the frame is formed of a conductive material and serves as the second electrode.

6. The display device according to claim 1, wherein the second electrode is formed on a back surface of the marginal portion of the front overhang.

7. The display device according to claim 1, wherein the touch panel comprises a touch sensor substrate, the touch sensor portion is formed on the touch sensor substrate, and the first electrode is provided in an inner peripheral portion of a back surface of the touch sensor substrate.

8. The display device according to claim 1, wherein the touch panel comprises a touch sensor substrate, the touch sensor portion is formed on the touch sensor substrate, and the first electrode is provided in an inner peripheral portion of a front surface of the touch sensor substrate.

9. The display device according to claim 1, wherein the touch panel comprises a touch sensor substrate and a protective plate that covers the front surface of the touch sensor substrate, and the first electrode is provided in an inner peripheral portion of a back surface of the protective plate.

10. The device according to claim 1, wherein the touch panel comprises a touch sensor substrate, the touch sensor portion is formed on the touch sensor substrate, and the first electrode is provided in an inner peripheral portion of a front surface of the touch sensor substrate.

11. The device according to claim 1, wherein the dielectric is between the touch panel and the marginal portion of the front overhang.

12. The device according to claim 1, wherein the central portion of the touch panel and the display surface of the display panel are adhered to each other via the dielectric without an air gap.

13. The device according to claim 1, wherein
   the display panel includes a polarizing plate, and
   the polarizing plate is in contact with both of the dielectric and the marginal portion of the front overhang.

14. The device according to claim 1, wherein the frame surrounds the display panel and houses the display panel inside a space surrounded by the frame.

* * * * *